US007267088B2

(12) United States Patent
Ezaki et al.

(10) Patent No.: US 7,267,088 B2
(45) Date of Patent: Sep. 11, 2007

(54) VALVE-DRIVING SYSTEM OF INTERNAL COMBUSTION ENGINE

(75) Inventors: Shuichi Ezaki, Susono (JP); Toshiaki Asada, Mishima (JP); Kimitoshi Tsuji, Susono (JP); Yasushi Kusaka, Susono (JP); Kenji Kataoka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 129 days.

(21) Appl. No.: 10/725,427

(22) Filed: Dec. 3, 2003

(65) Prior Publication Data
US 2004/0118367 A1 Jun. 24, 2004

(30) Foreign Application Priority Data
Dec. 5, 2002 (JP) ............................. 2002-354206

(51) Int. Cl.
*F01L 9/04* (2006.01)
(52) U.S. Cl. ................................ 123/90.11; 123/90.17; 123/90.31
(58) Field of Classification Search ............. 123/90.15, 123/90.16, 90.17, 90.18, 90.39, 90.44, 90.33, 123/90.27, 90.31, 90.6, 90.11; 251/129.01
See application file for complete search history.

(56) References Cited

U.S. PATENT DOCUMENTS

| | | | | |
|---|---|---|---|---|
| 5,327,856 A | * | 7/1994 | Schroeder et al. | ....... 123/90.11 |
| 5,331,931 A | | 7/1994 | Blish et al. | |
| 5,598,814 A | | 2/1997 | Schroeder et al. | |
| 5,873,335 A | | 2/1999 | Wright et al. | |
| 5,931,142 A | | 8/1999 | Gerling | |
| 6,324,845 B1 | * | 12/2001 | Fulks et al. | .................... 60/582 |
| 6,425,357 B2 | * | 7/2002 | Shimizu et al. | .......... 123/90.16 |
| 6,473,964 B1 | * | 11/2002 | Anderson et al. | .......... 29/888.1 |
| 6,739,299 B2 | * | 5/2004 | Suzuki | .................... 123/179.3 |

FOREIGN PATENT DOCUMENTS

| | | |
|---|---|---|
| DE | 198 25 964 A 1 | 12/1999 |
| EP | 0 469 702 A2 | 2/1992 |
| FR | 2 823 529 A1 | 10/1992 |
| JP | 08021326 A * | 1/1996 |
| JP | A 8-177536 | 7/1996 |
| JP | A 2001-152820 | 6/2001 |
| JP | 2002276364 A * | 9/2002 |
| WO | WO8500864 A * | 2/1985 |
| WO | WO 02/084082 A1 | 10/2002 |

OTHER PUBLICATIONS

English Translation of Chinese Office Action—Application No. 200310119796.4—Jan. 20, 2006.

* cited by examiner

*Primary Examiner*—Ching Chang
(74) *Attorney, Agent, or Firm*—Oliff & Berridge PLC

(57) ABSTRACT

A valve-driving system which is applied to an internal combustion engine having a plurality of cylinders for driving an intake or exhaust valve provided in each cylinder, including a plurality of valve-driving apparatuses provided for driving valves of different cylinders of the internal combustion engine, wherein each valve-driving apparatus includes an electrical motor as a driving source for generating rotation motion; and a power transmission mechanism for converting the rotation motion of the electric motor into opening and closing motion of the valve to be driven and for transmitting the opening and closing motion to the valve through a cam or a link.

28 Claims, 19 Drawing Sheets

FIG. 7
OPERATION CHARACTERISTICS TABLE
| DEGREE OF FREEDOM | LIFT SHAPE |
|---|---|
| (1) PHASE |  |
| (2) OPERATION ANGLE & LIFT |  |
| (3) OPERATION ANGLE |  |
| (4) LIFT |  |
| (5) LIFT SPEED |  |
| (6) CYCLE CHANGE |  |
| (7) INTERNAL EGR REQUIRED |  |
| (8) VALVE STOP | 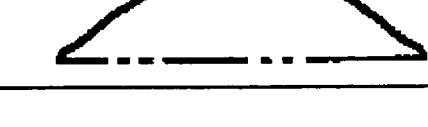 |

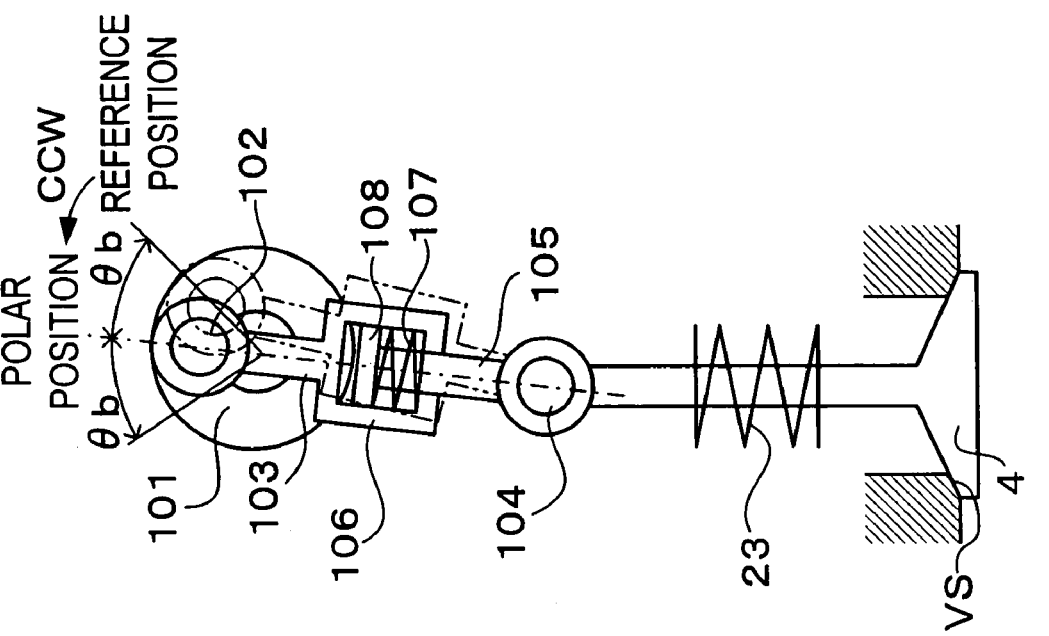
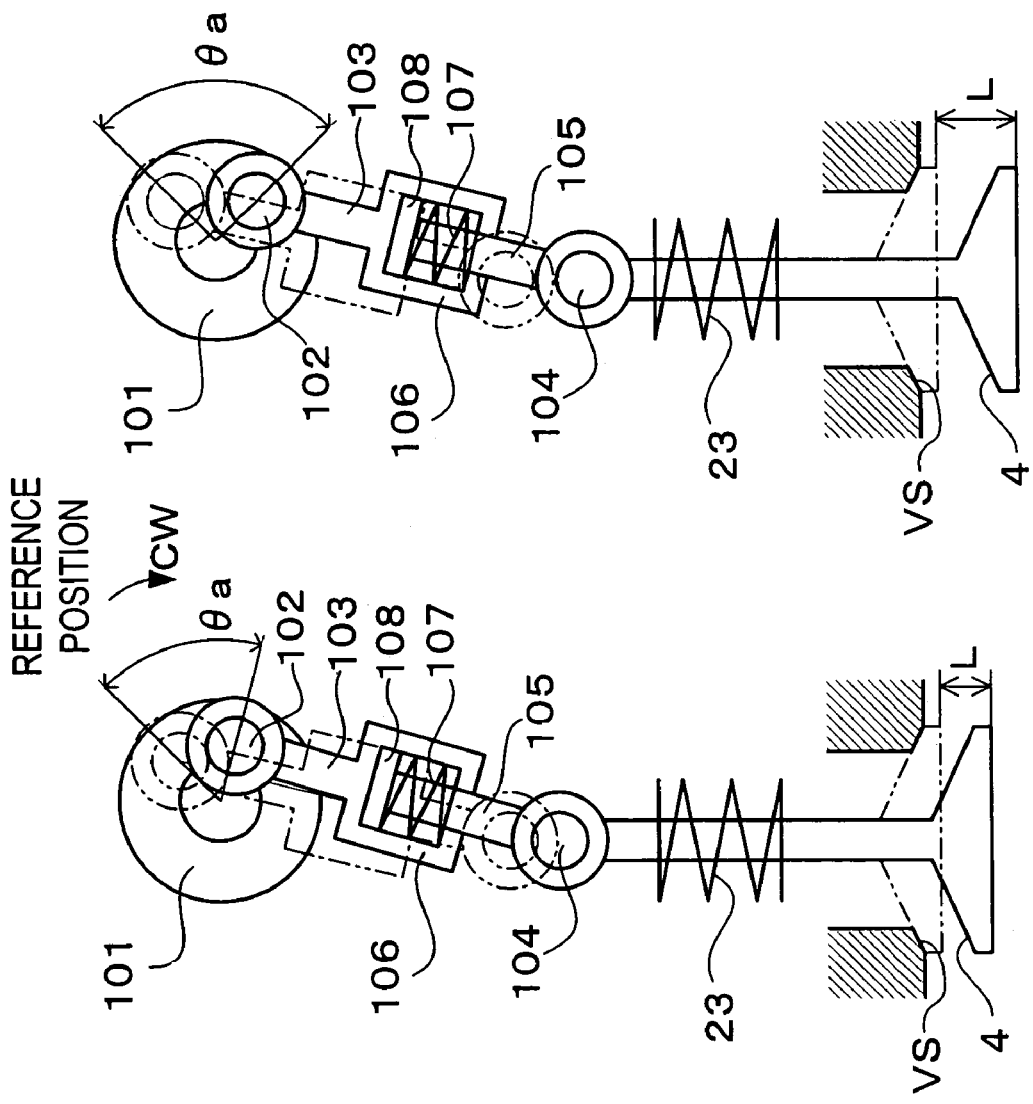

VALVE-DRIVING SYSTEM OF INTERNAL COMBUSTION ENGINE

BACKGROUND OF THE INVENTION

1. Field of the Invention

The present invention relates to a valve-driving system for driving an intake valve or an exhaust valve of an internal combustion engine.

2. Description of the Related Art

An intake valve or an exhaust valve of a conventional internal combustion engine is opened and closed by power taken out from a crank shaft of an internal combustion engine. In recent years, however, an attempt has been made to drive the intake valve or the exhaust valve by means of an electric motor. For example, Japanese Patent Application Laid-open No. 8-177536 discloses a valve-driving apparatus which drives a cam shaft by a motor to open and close the intake valve for driving an EGR valve, and there is also known a valve-driving apparatus which converts rotation of a motor into a straight opening and closing motion of the valve utilizing a screw mechanism provided on a valve stem (see JP-A No. 10-73178).

Since the apparatus which converts rotation of a motor into opening and closing motion of a valve by means of the screw mechanism is such that a necessary amount of rotation of the motor is great, thus being inefficient, it is not suitable as a driving apparatus of an intake valve or an exhaust valve which requires to operate the valve at high speed and periodically.

On the other hand, when the cam shaft is rotated by a motor, it is possible to drive the intake valve or the exhaust valve efficiently. In a multi-cylinder internal combustion engine which is generally used as a power source of a vehicle, a cam shaft is commonly used between a plurality of cylinders arranged in a single line. If the commonly used cam shaft is only driven by the motor, the variation of motion of the cam shaft affects operation characteristics of all of the intake valves and exhaust valves which are driven by the cam shaft. Therefore, flexibility of operation characteristics which are obtained by controlling the motor is not so high.

SUMMARY OF THE INVENTION

It is an object of the present invention to provide a valve-driving system of an internal combustion engine capable of efficiently opening and closing an intake valve or an exhaust valve of an internal combustion engine with a plurality of cylinders, and capable of enhancing the flexibility concerning the operation characteristics of each valve as compared with the conventional technique.

To achieve the object, the present invention provides a valve-driving system which is applied to an internal combustion engine having a plurality of cylinders for driving an intake or exhaust valve provided in each cylinder, comprising a plurality of valve-driving apparatuses, each of which is provided for at least each one of the intake valve and the exhaust valve, wherein each valve-driving apparatus comprises: an electrical motor as a driving source for generating rotation motion; and a power transmission mechanism for converting the rotation motion of the electric motor into opening and closing motion of the valve to be driven and for transmitting the opening and closing motion to the valve through a cam or a link.

According to this invention, the intake valves or the exhaust valves of the cylinders can independently be opened and closed by the valve-driving apparatuses. Therefore, the flexibility of operation characteristics of valves of each cylinder is enhanced. Since the rotation motion of the motor is converted into the opening and closing motion of the intake valve or exhaust valve utilizing the cam or link, a rate of momentum of the valve to the rotation amount of motor can be increased as compared with a case in which a screw mechanism is utilized. That is, in the case of the screw mechanism, the valve can not be opened and closed sufficiently without rotating the screw several times at least, but if the cam or link is utilized, since one period of momentum is completed by one rotation of the motor, it is possible to open and close the intake valve or exhaust valve by a predetermined amount only by rotating the motor one time at the most. Thus, it is possible to efficiently drive the intake valve or exhaust valve.

In the valve-driving system of the invention, each cylinder may be independently provided with the valve-driving apparatus. If each cylinder is independently provided with the valve-driving apparatus in this manner, it is possible to independently and freely set the operation characteristics of the intake valve or exhaust valve of each cylinder without being influenced by other intake valve or exhaust valve of other cylinder. Thus, the intake valve or exhaust valve can be provided with optimal operation characteristics for each cylinder. Further, if the intake valve and exhaust valve of each cylinder are independently provided with valve-driving apparatuses, it is possible to independently set the operation characteristics of the intake valve and exhaust valve of each cylinder, thus the intake valve and exhaust valve can be provided with optimal operation characteristics, respectively.

In the valve-driving system of the invention, the plurality of valve-driving apparatuses may drive intake valves or exhaust valves of different cylinders, and a case in which one or more, or all of the valve-driving apparatuses drive intake valves or exhaust valves of two or more cylinders is also included in the scope of the present invention. In cylinders in which time periods during which the intake valves are opened or exhaust valves are opened are not overlapped, even if the intake valves or exhaust valves of these cylinders are driven by a common electric motor, the operation characteristics of the intake valve or exhaust valve of each cylinder can be changed without being influenced by operation of the intake valve or exhaust valve driven by the commonly used electric motor.

When the power transmission mechanism converts the rotation motion of the electric motor into the opening and closing motion utilizing the cam, the valve-driving system of the invention can include the following modes.

The valve-driving apparatus may further comprise a valve-characteristics adjusting mechanism which changes a correlation of a phase of the cam and at least one of a lift amount and an operation angle of the valve. In this case, the operation characteristics of the valve can be changed more flexibly by cooperation between the control of the motor and the adjustment of the lift amount or operation angle by the valve-characteristics adjusting mechanism. For example, if the lift amount and the operation angle are changed by the valve-characteristics adjusting mechanism, and then the driving speed of the cam by the electric motor is controlled such that the change of the operation angle is cancelled, only the change of the lift amount can be realized.

The valve-driving apparatus may further comprise a torque fluctuation suppressing mechanism which suppresses fluctuation in torque which is applied to the cam from the valve. Generally, the cam receives a torque by a reaction force of a valve spring which biases the intake valve or exhaust valve in its closing direction, and the magnitude and direction of the torque are varied in accordance with phase of the cam. When the cams of many cylinders are driven by the common cam shaft as in the conventional technique, since the phases of the cams of the cylinders are deviated in the circumferential direction, a torque acting on any of cylinders through the cam is cancelled by a torque of other cylinder through the cam, and the fluctuation in torque acting on the cam shaft is suppressed. Whereas, in the case of a structure in which the valve-driving apparatus independently drives the intake valves or exhaust valves of different cylinders, since the rotation shaft of the cam is also divided for the valve-driving apparatuses, cancelling effect of torque between the plurality of cams having different directions cannot be expected. In such a case, if the torque fluctuation suppressing mechanism is provided for each of the valve-driving apparatuses, the fluctuation in torque applied to the cam can be suppressed in each valve-driving apparatus, and the output required for the electric motor of each valve-driving apparatus can be reduced.

The torque fluctuation suppressing mechanism may apply a reaction torque to a rotation member provided in a motion transmitting path extending from the electric motor to the cam, so that the reaction torque may cancel the fluctuation of a torque which is applied to the cam. If the reaction torque is applied, the variation of torque applied from the cam can be suppressed.

The torque fluctuation suppressing mechanism may include a cam surface provided on an outer periphery of the rotation member, a lifter opposed to the cam surface, and a spring device which biases the lifter against the cam surface, wherein a contour of the cam surface of the rotation member may be set such that a contact position between the lifter and the cam surface is most retracted toward a center of the rotation member in its radial direction at a position where a lift amount of the valve by the cam becomes maximum.

A torque applied from the valve spring of the intake valve or exhaust valve to the cam acts in a direction for returning the cam during a process in which the valve is to be opened by the cam, the torque is once lost at a position where the lift amount of the valve becomes maximum, i.e., a position where a nose section of the cam comes into contact with a following member (rocker arm or its valve), and the torque acts in a direction in which the cam advances during a process in which the cam advances from that position and the valve is to be closed. Whereas, the cam surface of the rotation member and the lifter are associated such that the contact position between the cam surface and the lifter is most retracted toward the center in the radial direction at a position where the lift amount becomes maximum. Therefore, a torque applied from the spring device to the rotation member through the lifter acts in a direction for advancing the cam during a process in which the valve is to be opened, and acts in a direction for returning the cam in the direction for closing the valve. Thus, the torque applied to the rotation member through the lifter acts as a reaction torque in a direction for cancelling the torque applied to the cam. The variation in torque applied from the valve becomes small at the time of high speed rotation of the cam. On the other hand, a force for pushing out the lifter by the rotation member in the radially outward direction becomes greater as the rotation speed of the rotation member is increased, and a force of the lifter pushing the rotation member becomes smaller as the rotation speed is increased. Thus, the reaction torque applied to the rotation member at the time of high speed rotation is also reduced. With this, excessive torque load from the lifter to the rotation member is prevented from applying. Since the force of the lifter pushing the rotation member is reduced and thus a friction force acting between the rotation member and the lifter is reduced, it is possible to suppress the friction loss at the time of high speed rotation and to prevent high fuel consumption.

The rotation shaft of the cam may be provided with a shaft supporting section which rotatably fits to a cam supporting bearing, and a factor which affects a friction resistance generated in a contact range between the shaft supporting section and the bearing may be set unevenly with respect to a circumferential direction of the rotation shaft of the cam, so that the shaft supporting section and the bearing function as the torque fluctuation suppressing mechanism. If the friction resistance acting between the rotation shaft of the cam and the cam supporting bearing is set unevenly with respect to the circumferential direction in this manner, it is possible to suppress the variation of torque required for driving the rotation shaft of the cam by the electric motor by reducing the friction resistance in a portion where the torque applied to the cam becomes great and by increasing the friction resistance at a portion where the torque applied to the cam becomes small.

Various factors affect the friction resistance, but a typical example of the factor is a width of the contact range. That is, if the width of the contact range with respect to the axial direction of the rotation shaft of the cam is set unevenly, it is possible to unevenly set the factor which affects the friction resistance. If the width of the contact range is increased, the friction resistance is increased, and if the width of the contact range is decreased, the friction resistance is reduced. In addition to this, it is possible to adjust the friction resistance by various means such as by changing friction coefficient in the contact range of the shaft supporting section.

A portion of the friction resistance which is increased is located on opposite side from a nose section of the cam with a rotation center of the rotation shaft of the cam interposed therebetween. When the nose section passes through the contact position between the cam and the cam follower, a torque applied to the cam is once lost. In other words, the torque applied to the cam is once lost at a position where the lift amount of the valve by the cam becomes maximum. Thus, the torque applied to the cam is relatively largely varied in the vicinity of the position where the maximum lift amount is given. On the other hand, in the vicinity of the position where the nose section of the cam comes into contact with the cam follower, the rotation shaft of the cam is pushed against the nose section of the cam with the rotation center interposed therebetween by a reaction force applied to the nose section from the valve. Therefore, if a portion where the friction resistance becomes great is provided on the opposite side from the nose section of the cam, the portion in which the friction resistance of the rotation shaft of the cam becomes great comes into contact with the bearing in the vicinity of the position where the lift amount of the valve becomes maximum, and friction resistance acting on the rotation shaft of the cam increases. The fluctuation in torque applied to the cam by the increase of the friction resistance is suppressed.

The rotation shaft of the cam may be provided with a balance adjusting device which cancels an unbalance of rotation mass concerning a rotation center of the rotation shaft provided by the cam. A general cam has such a shape that a portion of a base circle which is coaxial with the rotation shaft swells to form a nose section. A balance of rotation mass with respect to the rotation center of the rotation shaft of the cam is disturbed by the nose section of the cam. However, in the case of a cam shaft which is commonly used between many cylinders, since the cams of the cylinders are oriented in different directions, the unbalance of the rotation of masses of the cams are cancelled, and the rotation masses of the cam shafts are well balanced around the rotation center on the whole. Whereas, in the valve-driving system of the present invention, since the rotation shaft of the cam is divided, cancelling effect of the unbalance of the rotation of masses between the plurality of cams having different directions cannot be expected. In such a case, if the balance adjusting device is provided in each valve-driving apparatus, it is possible to improve the balance of the rotation mass concerning the rotation center for each rotation shaft of the cam, and to reduce the output required for the electric motor. The unbalance of the rotation mass provided by the cam means an unbalance of rotation mass generated as the mass is deviated toward the nose section of the cam. The "cancellation" of the unbalance includes a conception of reduction of the unbalance of the rotation mass provided by the cam and a conception of completely deleting the unbalance.

The rotation shaft of the cam may be provided, as the balance adjusting device, with a deleting section which reduces the mass of the rotation shaft at a position closer to the nose section of the cam than the rotation center. If a weight is further added to the rotation shaft of the cam for cancelling the unbalance of the rotation mass, even if the rotation masses are balanced, the moment of inertia of the rotation shaft of the cam is increased and as a result, a torque required for the electric motor is increased. Whereas, if the deleting section is provided, it is possible to reduce or cancel the unbalance of the rotation mass without increasing the moment of inertia. Here, the "deleting section" can be constituted as a hole, a groove, a recess, a notch or the like.

A hole which is deviated closer to the nose section than the rotation center of the rotation shaft of the cam may be formed as the deleting section, and the hole is utilized as an oil-supply hole to the cam. With this, the oil-supply hole can be utilized as the balance adjusting device.

The contour of the cam may appropriately be set in accordance with required operation characteristics of the cam. In the valve-driving system of the invention, since various operation characteristics can be obtained by controlling the electric motor of each valve-driving apparatus, it is preferable that entire periphery of a contour of the cam comprises a projecting curve surface. This is because that if a portion of the contour of the cam is provided with a recessed curved surface, i.e., a negative curvature, it becomes necessary to use a grindstone having a small radius to polish such portion, and adaptability for mass production of the cams is to be deteriorated.

The rotation shaft of the cam is provided with one of a permanent magnet and an electromagnetic coil, and the other one of the permanent magnet and the electromagnetic coil is provided around the rotation shaft, thus the rotation shaft of the cam may be utilized as a rotation shaft of the electric motor. In such a case, a gear train and the like for transmitting the rotation from the rotation shaft (output shaft) of the electric motor to the rotation shaft of the cam becomes unnecessary, and the height of the valve-driving apparatus can be suppressed.

Next, when the power transmission mechanism converts the rotation motion of the electric motor into the opening and closing motion utilizing a link, the valve-driving system of the invention can further include the following modes.

The power transmission mechanism may include a rotation member which is rotated by the electric motor, and a link section which is rotatably connected to the rotation member at a position deviated from the rotation center of the rotation member, and which is also turnably connected to the valve. In this case, the rotation motion of the rotation member can be converted into the straight opening and closing motion of the valve by the link section. When the electric motor is alternately rotated normally and reversely within a range of less than one rotation, the lift amount of the valve can be changed by increasing or reducing the normal or reverse rotation angle.

The link section may include a first link which is rotatably connected to the rotation member, and a second link which is slidably connected to the first link within a predetermined limited range and which is turnably connected to the valve. In this case, in a process in which a connection point between the rotation member and the first link rotates in a direction approaching the valve, the first and second links are integrally operated in a state in which they abut against each other (i.e., in a state in which the entire length of the link section is the shortest), and the rotation motion of the rotation member is converted into an operation for opening the valve. On the other hand, when the connection point between the rotation member and the first link is rotated in a direction being away from the valve, the valve is closed about halfway through the rotation, and if the connection point between the rotation member and the first link is further away from the valve, the second link extends with respect to the first link and the rotation member rotates while the valve is held closed. For this reason, a region called a dead zone where the valve is not operated even if the electric motor rotates is provided. By providing such a dead zone region, the slide speed in the connection point between the link and the rotation member is increased, the oil film formation at the sliding portions is facilitated, and the friction and wear are reduced. Therefore, a torque to be generated by the electric motor is reduced, and it becomes easy to control the speed of the electric motor.

The power transmission mechanism may include a rotation member which is rotated by the electric motor, a first link which is rotatably connected to the rotation member at a position deviated from the rotation center of the rotation member, a second link which is rotatably connected to the first link and the valve, and a position adjusting device which changes a position of connection point between the first link and the second link. In this case, the rotation motion of the rotation member is transmitted to the second link through the first link, and the second link swings around the connection point between the second link and the first link. This swinging motion of the second link is converted into the straight opening and closing motion and transmitted to the valve. By changing the position of the connection point between the first link and the second link, it is possible to change the distance between the connection point between the rotation member and the first link and the connection point between the second link and the valve, thereby changing the lift amount of the valve.

The valve-driving system of the present invention can include the following modes irrespective of which one of the cam or the link the power transmission mechanism utilizes.

That is, in the valve-driving system of the invention, the electric motor of any one of the plurality of valve-driving apparatuses is utilized as a driving source of an air pressure adjusting pump. In this case, since the electric motor of the valve-driving apparatus is utilized as a driving source for adjusting air pressure of a specific device, it is possible to reduce the number of parts.

The electric motor utilized as the driving source of the pump may be appropriately selected from the plurality of valve-driving apparatuses. In one preferable example, the electric motor which drives the valve of the cylinder which is disposed on the outermost side in the arrangement direction of the cylinders is utilized as the driving source of the air pressure adjusting pump. An outer space of that electric motor is an open space where another electric motor is not disposed. Therefore, it is relatively easy to dispose the pump and a mechanism for taking out the rotation motion to the pump as compared with an electric motor corresponding to another cylinder. In an internal combustion engine in which combustion in one or some of cylinders is stopped at the time of deceleration to realize operation with reduced number of cylinders, it is preferable that an electric motor which drives an intake valve or exhaust valve of a cylinder whose number of cylinders is not reduced, (that is, whose combustion is not stopped) is utilized as the driving source of the pump. This is because that the pump is operated to obtain a desired air pressure even when the number of cylinders is reduced.

The air pressure adjusting pump may be used for various purposes. In a preferred example, the pump is provided as a device which generates a negative pressure for a brake booster of a vehicle. In this case, an appropriate negative pressure can be applied to the brake booster by an electric motor which drives the intake valve or exhaust valve. Therefore, when sufficient negative pressure cannot be obtained in an intake system of the internal combustion engine, for example, in the case of a cylinder direct injection type or lean fuel-air mixture combustion type internal combustion engine in which stratified charge is realized and an opening of the throttle valve is set to a large value, or in the internal combustion engine in which the intake air amount is increased by the opening area (the product of the lift amount and the operation angle) of the intake valve instead of the throttle valve, a practical value for driving a negative pressure generating pump by the electric motor which drives the intake valve or exhaust valve is great.

When the internal combustion engine is started by utilizing the combustion energy, for example, when combustion is caused in a specific cylinder which is in an expansion stroke in a state in which the internal combustion engine is stopped, and the internal combustion engine is started utilizing the energy obtained by the combustion, the pump for charging air into the specific cylinder may be driven by the electric motor of the valve-driving apparatus of the present invention. In this case, air may be fed to the cylinder from the pump, or air fed by the pump may be once accumulated in a tank and when the engine is started, the air may be fed to the specific cylinder from the tank. A member such as the brake booster which requires a negative pressure may be connected to an intake side of the pump, a discharging side of the pump may be connected to a tank to accumulate the pressure in the tank, and the accumulated pressure may be used for charging air into a specific cylinder when the engine is started. In such a mode, the pump functions as both a device which generates a negative pressure and a device which accumulates the air pressure.

In the valve-driving system of the present invention, at least a portion of the electric motor may be exposed from an external upper surface of a head cover of the internal combustion engine. With such a structure, it is possible to bring the electric motor into contact with air outside the head cover and to facilitate the radiation of heat from the electric motor. It is possible to reduce the working temperature range of the electric motor to avoid the reduction of output at the high temperature, and thereby allowing an electric motor having a small rated output to be used.

The head cover of the internal combustion engine covers a space in which mechanisms such as a cam or a link of the power transmission mechanism are accommodated, and functions as a cover which prevents lubricant oil supplied from these mechanisms from scattering. Therefore, members, having inferior adaptability to poor environment in which the temperature is high or oil scatters such as an electrical connector of the electric motor, should not be disposed in the head cover. If such members are exposed from the head cover, frequency for causing inconvenience in the electric motor is reduced due to the environment in which the electric motor is disposed and thus, the reliability of the valve-driving system of the present invention can be enhanced.

In the valve-driving system of the invention, the electric motor is taken out from the head cover of the internal combustion engine and is disposed on an upper surface of the head cover. With this structure, the electric motor is away from the interior of the head cover, and the electric motor can be protected, to the utmost, against high temperature and oil environment in the head cover. Further, heat radiation effect of the electric motor is also enhanced.

When at least a portion of the electric motor is exposed from the head cover, the internal combustion engine may be mounted in the vehicle in a state that the arrangement direction of the plurality of cylinders coincides with the lateral direction of the vehicle, and that a cylinder head is located forward of a crank chamber. If the internal combustion engine is mounted in this manner, when the vehicle moves forward, air flowing around the internal combustion engine can be allowed to positively abut against the exposed portion of the electric motor outside the head cover, and the cooling efficiency of the electric motor can be enhanced.

The valve-driving system of the invention may further comprise a cooling device which cools the electric motor. By actively cooling the electric motor, the increase in the working temperature range which reduces the output of the electric motor is avoided, and sufficient output for driving the intake valve or exhaust valve can be generated even by a smaller electric motor.

Various cooling devices may be used. In one example of the cooling device, a cooling water passage is provided around the electric motor, and the cooling water passage is included in a portion of a circulation path of cooling water in the internal combustion engine. According to such a cooling device, since the electric motor can forcibly be cooled utilizing the cooling water of the internal combustion engine, the electric motor can be cooled efficiently as compared with heat exchange using surrounding air. Especially, when the cooling water passage around the electric motor is disposed between the cooling water outlet of a radiator for heat radiation and the cooling water inlet of the internal combustion engine, the cooling water in the lowest temperature region before heat exchange between the internal combustion engine and the cooling water is carried out is introduced into surrounding of the electric motor. Therefore, the cooling effect of the electric motor by the cooling water can be enhanced to the utmost.

A fan may be provided, as the cooling device, on the rotation shaft of the electric motor. In this case, air flow is generated around the electric motor utilizing the output of the electric motor itself, and the cooling efficiency of the electric motor can be enhanced.

Further, when at least a portion of the electric motor is exposed from the head cover, it is possible to employ such a structure that a connector of the electric motor is exposed from an upper portion of the head cover of the internal combustion engine, the valve-driving system further comprises a wiring member having a common substrate on which individual terminals, an aggregation terminal and an electric wiring are formed, in which each individual terminal is to be connected to each connector, the aggregation terminal is to be connected to a predetermined motor control circuit, the electric wiring connects these terminals, and the wiring member is provided on the head cover such as to electrically connect each individual terminal and the connector. With this structure, electric wiring can be set in the connector of each electric motor from the aggregation terminal only by mounting the wiring member on the head cover in a manner as described above. Since the wiring member is also exposed from the upper portion of the head cover, the wiring path to each electric motor is not exposed to the high temperature in the head cover, heat loss of current is prevented and the actual output of the electric motor is enhanced.

The preferred modes utilizing the cam can be interpreted as preferred modes of the invention corresponding to an valve-driving apparatus of an internal combustion engine for driving an intake or exhaust valve thereof, and the valve-driving apparatus may comprise an electric motor as a driving source for generating rotation motion, and a power transmission mechanism which converts the rotation motion of the electric motor into the opening and closing motion of the valve to be driven through the cam. Further, preferred modes utilizing the link may be interpreted as preferred modes of the invention corresponding to a valve-driving apparatus of an internal combustion engine for driving an intake or exhaust valve thereof, and the valve-driving apparatus may comprise an electric motor as a driving source for generating rotation motion, and a power transmission mechanism which converts the rotation motion of the electric motor into opening and closing motion of the valve to be driven through the cam. The invention concerning these valve-driving apparatuses may be provided with the above described technical features of the air pressure adjusting pump, the arrangement of the motor with respect to the head cover, the mounting orientation of the engine to the vehicle, and the cooling device for the motor.

BRIEF DESCRIPTION OF THE DRAWINGS

FIG. 7 is a Table showing operation characteristics of a valve which can be realized by the valve-driving apparatus shown in FIG. 2.

FIG. 18A is a side view and FIG. 18B is a front view.

FIGS. 19A, 19B and 19C show operation of the valve-driving apparatus shown in FIGS. 18A and 18B.

FIG. 20A is a side view, FIG. 20B is a front view and FIG. 20C shows a state in which a lift amount is changed.

PREFERRED EMBODIMENTS

Detailed Description of the Preferred Embodiments

First Embodiment

Figure 1:
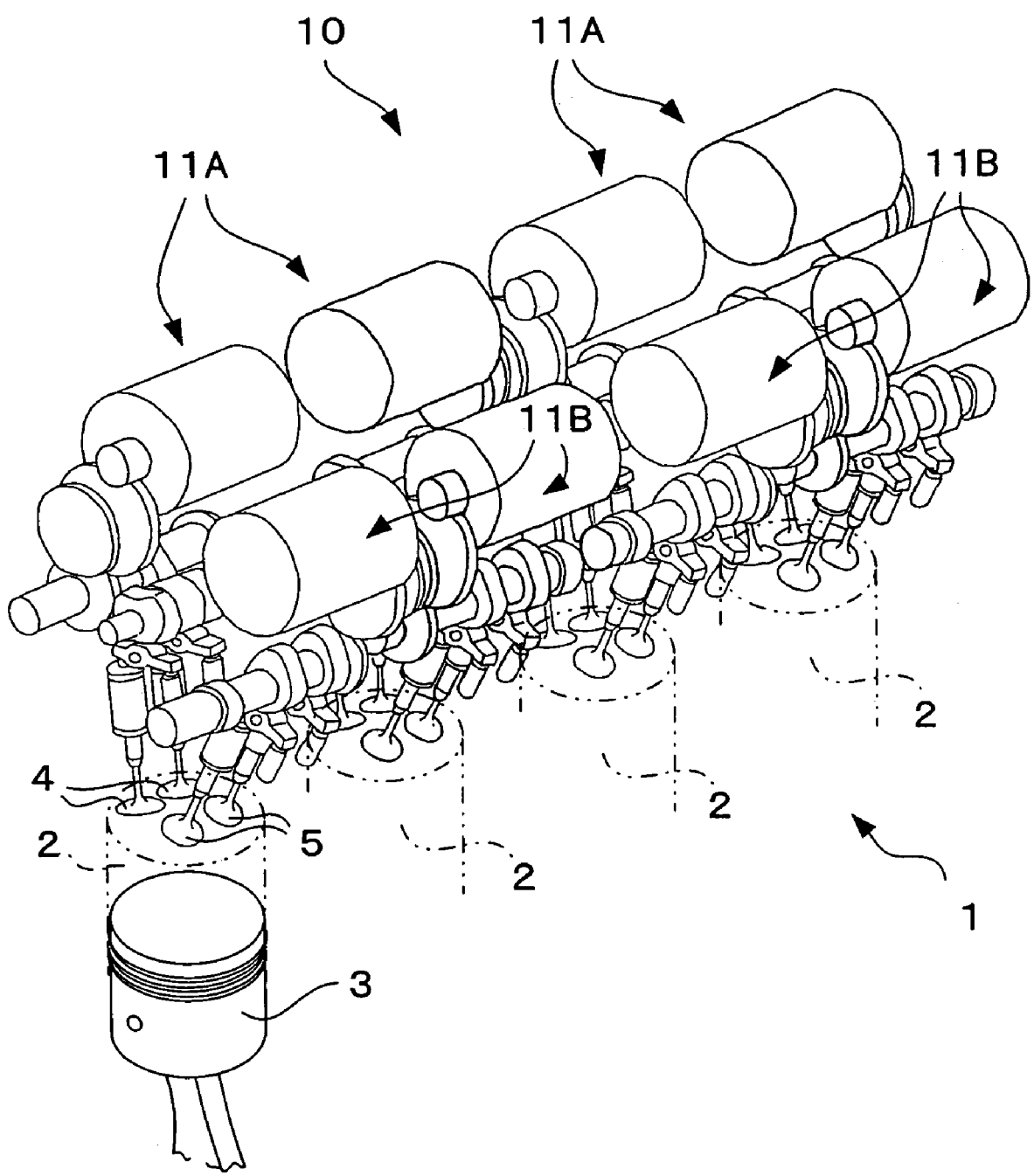
FIG. 1 is a perspective view showing an essential portion of a valve-driving system according to a first embodiment of the present invention.

FIG. 1 shows an internal combustion engine 1 in which a valve-driving system according to the first embodiment of the present invention is incorporated. The internal combustion engine 1 is a multi-cylinder in-line gasoline engine. In the engine, a plurality of (four in FIG. 1) cylinders 2 . . . 2 are arranged in one direction, and pistons 3 are mounted in the respective cylinders 2 such that the pistons 3 can move vertically. Two intake valves 4 and two exhaust valves 5 are provided above each cylinder 2. These intake valves 4 and exhaust valves 5 are opened and closed by a valve-driving system 10 in association with vertical motion of the piston 3, thereby drawing air into the cylinder 2 and exhausting air from the cylinder 2.

Figure 2:
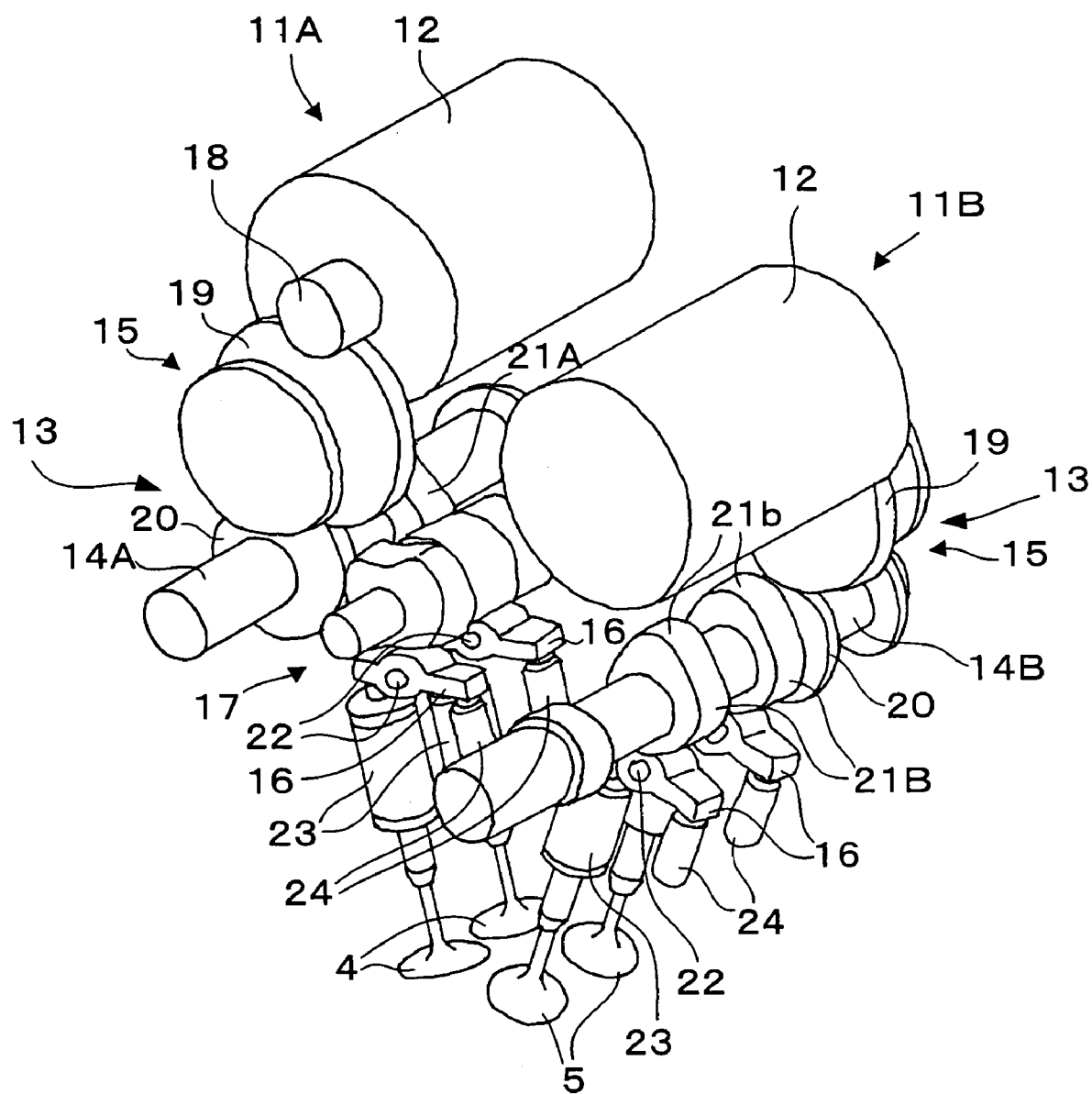
FIG. 2 is a perspective view showing a structure of a valve-driving apparatus which is correspondingly provided in one cylinder.

The valve-driving system 10 includes valve-driving apparatuses 11A . . . 11A provided on an intake-side of each cylinder 2 one each, and valve-driving apparatuses 11B . . . 11B provided on an exhaust-side of each cylinder 2 one each. The valve-driving apparatuses 11A and 11B drive the intake valve 4 or the exhaust valve 5 utilizing a cam. The valve-driving apparatuses 11A . . . 11A have the same structures and the valve-driving apparatuses 11B . . . 11B also have the same structures. FIG. 2 shows intake and exhaust valve-driving apparatuses 11A and 11B which are correspondingly provided in each cylinder 2. Since the valve-driving apparatuses 11A and 11B have similar structures, the intake-side valve-driving apparatus 11A will first be explained.

The intake-side valve-driving apparatus 11A includes an electric motor (which is called motor hereinafter in some cases) 12 as a driving source, and a power transmission mechanism 13 which converts rotation motion of the motor 12 into a straight opening and closing motion of the intake valve 4. A DC brushless motor or the like which can control the rotation speed is used as the motor 12. A position detecting sensor such as a resolver, a rotary encoder or the like for detecting a rotation position of the motor 12 is incorporated in the motor 12.

The power transmission mechanism 13 includes a single cam shaft 14A, a gear train 15 which transmits rotation motion of the motor 12 to the cam shaft 14A, a rocker arm 16 which drives the intake valve 4, and a valve-characteristics adjusting mechanism 17 interposed between the cam shaft 14A and the rocker arm 16. The cam shaft 14A is independently provided for each cylinder 2. That is, the cam shaft 14A is branched off for each cylinder 2. The gear train 15 transmits, through an intermediate gear 19, the rotation of the motor gear 18 mounted to an output shaft (not shown) of the motor 12 to a cam-driving gear 20 which is integrated with the cam shaft 14A, thereby rotating the cam shaft 14A in synchronization with the motor 12.

Figure 3:
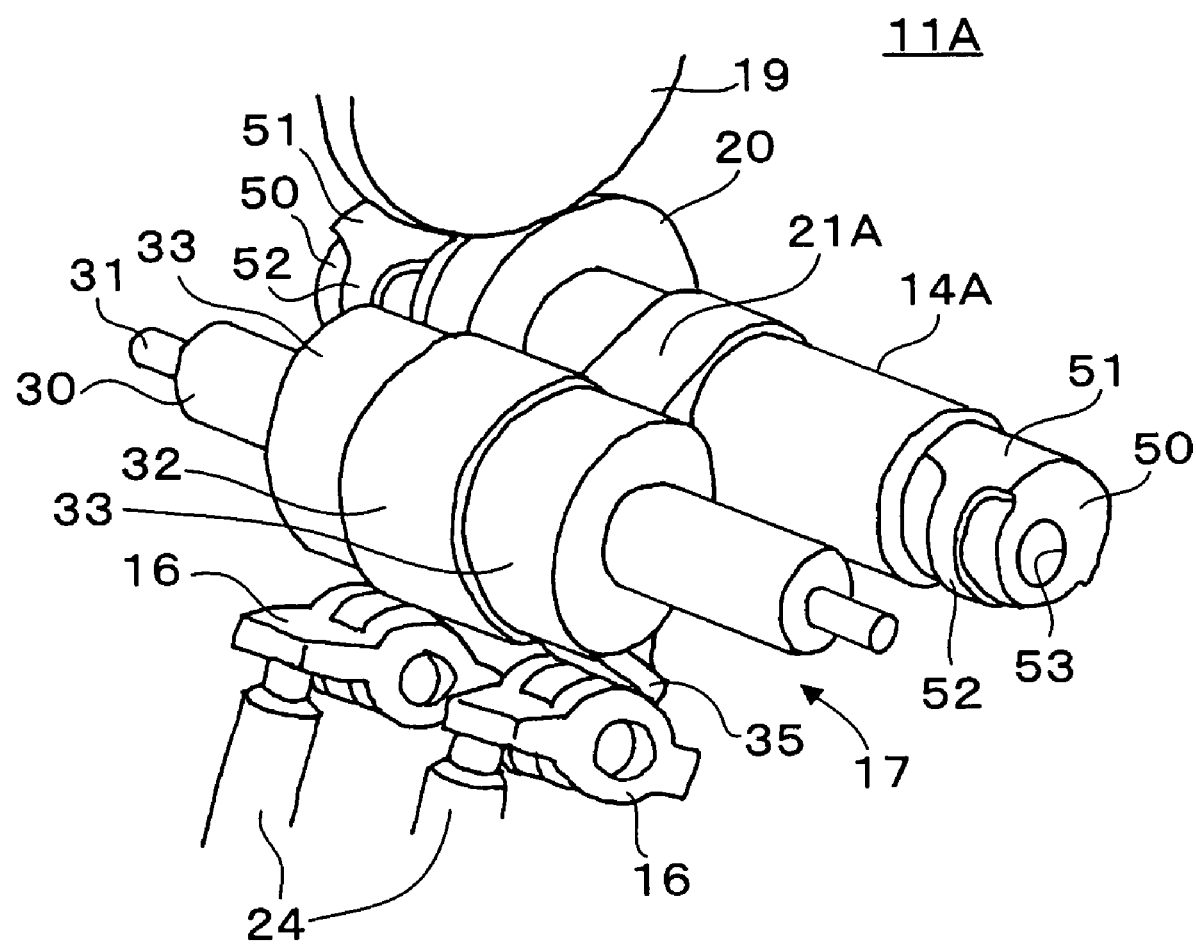
FIG. 3 is a perspective view of the valve-driving apparatus as viewed from another direction.
Figure 4:
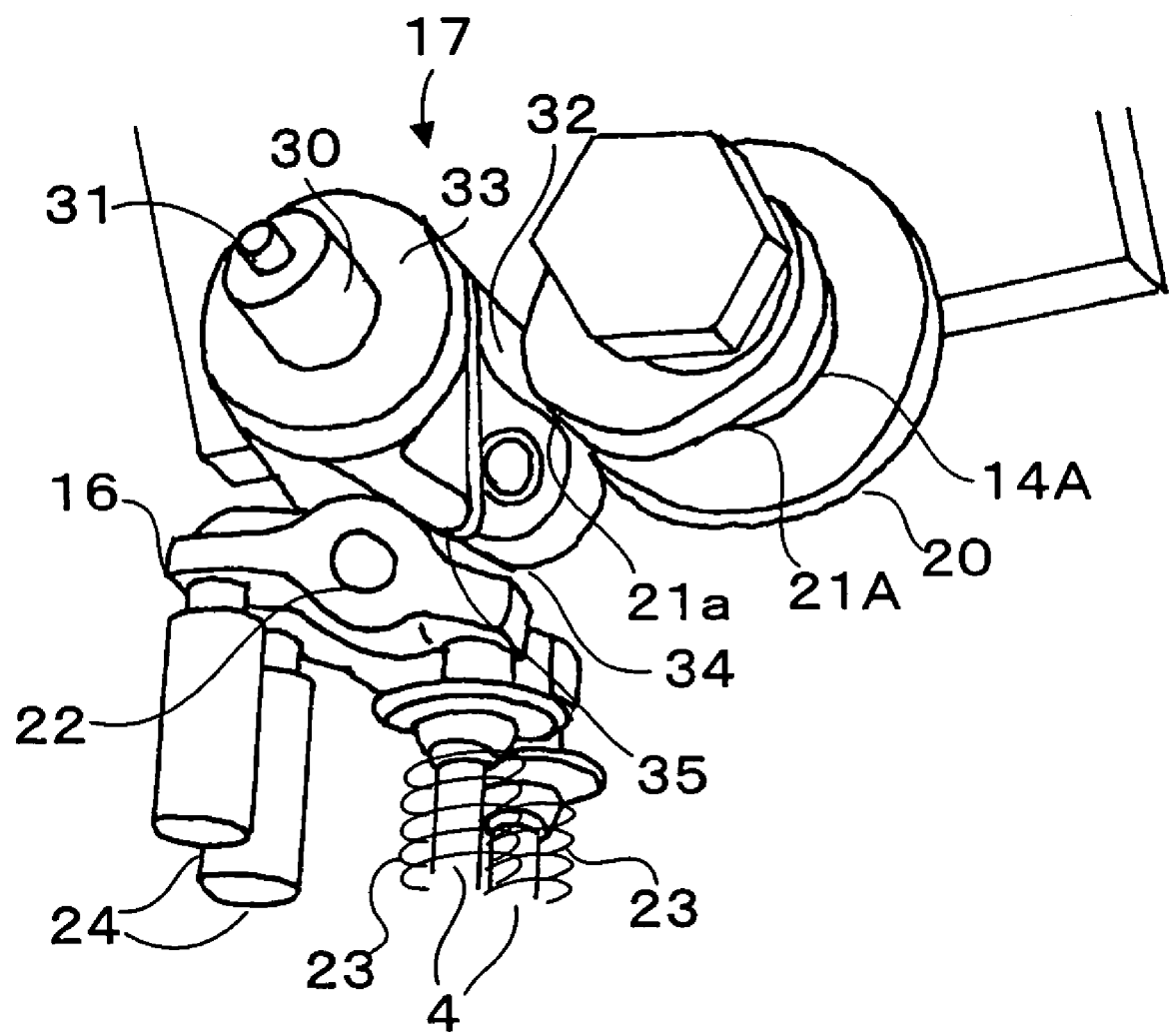
FIG. 4 is a perspective view of the valve-driving apparatus as viewed from further another direction.

As shown in FIGS. 3 and 4 also, the cam shaft 14A is rotatably provided with a single cam 21A. The cam 21A is formed as one kind of a plate cam in which a portion of a base circle which is coaxial with the cam shaft 14A swells. The profiles (contour of outer periphery) of the cams 21A between all of the valve-driving apparatuses 11A are the same. The profile of the cam 21A is set such that a negative curvature is not generated along the entire periphery of the cam 21A, i.e., such that the profile draws a projecting curved surface radially outward.

The rocker arm 16 can swing around a spindle 22. The intake valve 4 is biased toward the rocker arm 16 by the valve spring 23, which brings the intake valve 4 into intimate contact with a valve seat (not shown) of an intake port to close the intake port. The other end of the rocker arm 16 is in contact with an adjuster 24. If the adjuster 24 pushes up the other end of the rocker arm 16, the one end of the rocker arm 16 is held contacted with an upper end of the intake valve 4.

The valve-characteristics adjusting mechanism 17 functions as an intermediacy device which transmits the rotation motion of the cam 21A as swinging motion to the rocker arm 16, and also functions as a lift amount and operation angle changing device which changes the lift amount and the operation angle of the intake valve 4 by changing a correlation between the rotation motion of the cam 21A and the swinging motion of the rocker arm 16.

Figure 5:
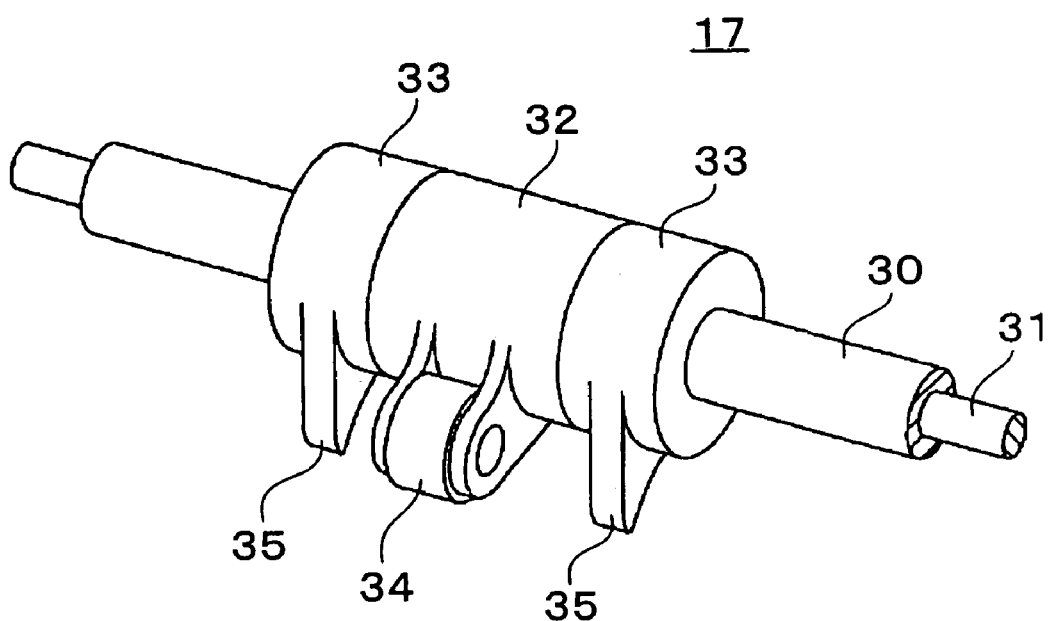
FIG. 5 is a perspective view of a valve-characteristics adjusting mechanism.

As shown in FIG. 5, the valve-characteristics adjusting mechanism 17 includes a supporting shaft 30, an operation shaft 31 which passes through a center of the supporting shaft 30, a first ring 32 disposed on the supporting shaft 30, and two second rings 33 and 33 disposed on opposite sides of the first ring 32. The supporting shaft 30 is fixed to a cylinder head or the like of the internal combustion engine 1. The operation shaft 31 is reciprocated in an axial direction (in directions R and F in FIG. 6) of the supporting shaft 30 by an actuator (not shown). The first ring 32 and second rings 33 are supported such that they can swing around the supporting shaft 30 and slide in the axial direction thereof. A roller follower 34 is rotatably mounted on an outer periphery of the first ring 32, and noses 35 are respectively formed on outer peripheries of the second rings 33.

Figure 6:
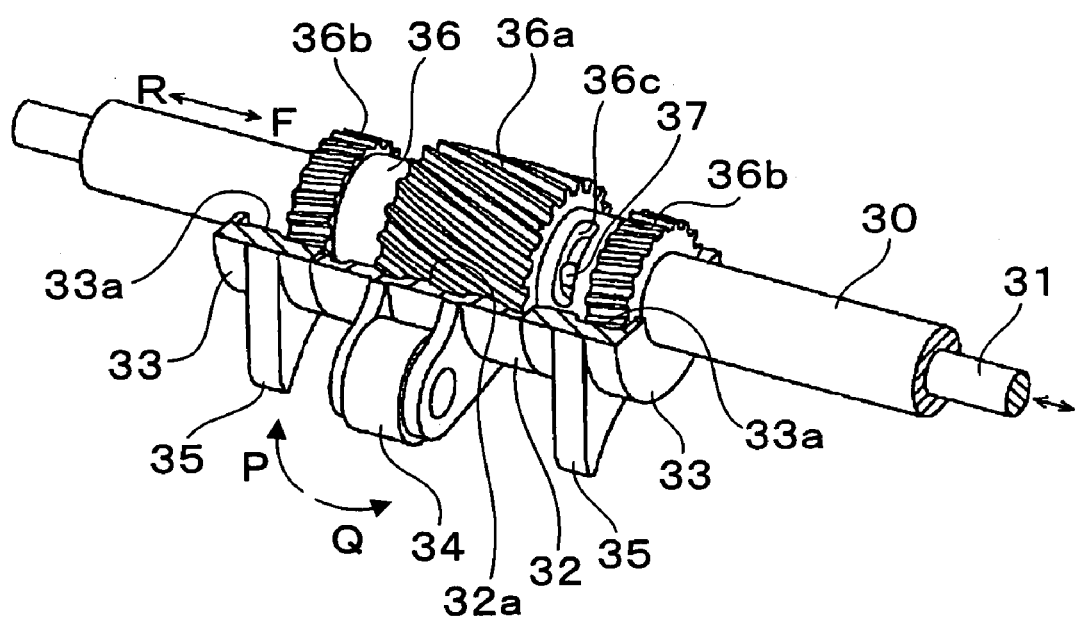
FIG. 6 is a partially cut-away perspective view of the valve-characteristics adjusting mechanism.

As shown in FIG. 6, the supporting shaft 30 is provided at its outer periphery with a slider 36. The slider 36 includes an elongated hole 36C extending in its circumferential direction. If a pin 37 mounted to the operation shaft 31 engages in the elongated hole 36c, the slider 36 can slide in the axial direction integrally with the operation shaft 31 with respect to the supporting shaft 30. The supporting shaft 30 is formed with an elongated hole (not shown) in the axial direction. The elongated holes permit the pin 37 to move in the axial direction. The slider 36 is integrally provided, at its outer periphery, with a first helical spline 36a and second helical splines 36b and 36b disposed such as to sandwich the first helical spline 36a. A twisting direction of the second helical spline 36b is opposite from that of the first helical spline 36a. The first ring 32 is formed, at its inner periphery, with a helical spline 32a which meshes with the first helical spline 36a. The second ring 33 is formed, at its inner periphery, with a helical spline 33a which meshes with the second helical spline 36b.

As shown in FIG. 4, the valve-characteristics adjusting mechanism 17 is added to the internal combustion engine 1 in such a manner that the roller follower 34 thereof is opposed to the cam 21A while the noses 35 are opposed to ends of the rocker arms 16 corresponding to the respective intake valves 4. If the roller follower 34 comes into contact with the nose section 21a and is pushed down as the cam 21A rotates, the first ring 32 supporting the roller follower 34 rotates on the supporting shaft 30, its rotation motion is transmitted to the second ring 33 through the slider 36, and the second ring 33 rotates in the same direction as that of the first ring 32. By the rotation of the second ring 32, the nose 35 pushes down one end of the rocker arm 16, the intake valve 4 is downwardly displaced against the valve spring 23 to open the intake port. If the nose section 21a gets over the roller follower 34, the intake valve 4 is pushed upward by a force of the valve spring 23 to close the intake port. In this manner, the rotation motion of the cam shaft 14A is converted into the opening and closing motion of the intake valve 4.

In the valve-characteristics adjusting mechanism 17, if the operation shaft 31 is displaced in the axial direction and the slider 36 is allowed to slide with respect to the supporting shaft 30 as shown in FIG. 6 with the arrows R and F, the first ring 32 and the second rings 33 are rotated in the opposite direction in the circumferential direction. When the slider 36 is moved in the direction of the arrow F, the first ring 32 is rotated in the direction of arrow P and the second rings 33 are rotated in the direction of arrow Q, and a distance between the roller follower 34 and the nose 35 in the circumferential direction is increased. On the other hand, if the slider 36 is moved in the direction of arrow R, the first ring 32 is rotated in the direction of arrow Q and the second rings 33 are rotated in the direction of arrow P, and the distance between the roller follower 34 and the nose 35 in the circumferential direction is reduced. As the distance between the roller follower 34 and the nose 35 is increased, the pushing-down amount of the rocker arm 16 by the nose 35 is increased. With this, the lift amount and the operation angle of the intake valve 4 are also increased. Therefore, as the operation shaft 31 is operated in the direction of arrow F shown in FIG. 6, the lift amount and the operation angle of the intake valve 4 are increased.

According to the valve-driving apparatus 11A configured as described above, if the cam shaft 14A is continuously driven in one direction at half the speed (called basic speed hereinafter) of rotation speed of the crank shaft of the internal combustion engine 1, the intake valve 4 can be opened and closed in synchronization with rotation of the crank shaft like a conventional mechanical valve-driving apparatus that drives the valve by the power from the crank shaft. Further, the lift amount and the operation angle of the intake valve 4 can be changed by the valve-characteristics adjusting mechanism 17.

Further, according to the valve-driving apparatus 11A, by changing the rotation speed of the cam shaft 14A by the motor 12 from the basic speed, it is possible to change the correlation between the phase of the crank shaft and the phase of the cam shaft 14A, and to variously change the operation characteristics of the intake valve 4. This point will be explained referring to FIG. 7. Solid lines and phantom lines of "lift shape" in the Table shown in FIG. 7 indicate different operation characteristics which are set by the valve-driving apparatus 11A, respectively. A lateral axis of the lift shape indicates a crank angle, and a vertical axis indicates the lift amount.

The change in phase shown in the item (1) of the Table of operation characteristics in FIG. 7 and the change of the operation angle and lift amount shown in the item (2) can be realized in a mechanical valve-driving apparatus. For example, by deviating the phases of the crank shaft and the cam shaft from each other, the change of the phase of the intake valve shown in the item (1) of the operation characteristics Table can be realized. The change in the item (2) of the operation characteristics Table can be realized if the valve-characteristics adjusting mechanism 17 is utilized. If the cam shaft 14A is driven by the motor 12, the phase of the cam shaft 14A is not restricted by the phase of the crank shaft. Therefore, if the rotation speed of the cam shaft 14A by the motor 12 is temporarily increased or reduced as compared with the basic speed, the change in the item (1) phase can easily be realized. If the motor 12 is stopped by the cam 21A in the halfway of opening of the intake valve 4 and then the motor 12 is reversely rotated, the operation characteristics of the item (2) can be applied to the intake valve 4.

In addition to the change of the operation characteristics, the valve-driving apparatus 11A can change the operation characteristics of the intake valve 4 as shown in the items (3) to (8) of the operation characteristics Table in FIG. 7. In the Table, the item (3) shows an example in which the operation angle is changed while maintaining the lift amount constant. This change of the operation characteristics is realized by driving the cam shaft 14A at higher speed than the basic speed (synchronization speed) while the intake valve 4 is opened. In the Table, the item (4) shows an example in which the lift amount is changed while maintaining the operation angle constant. This change is realized by changing the lift amount by the valve-characteristics adjusting mechanism 17 and by adjusting the rotation speed of the cam shaft 14A by the motor 12 such that the change of the operation angle caused by the change of the lift amount of the valve-characteristics adjusting mechanism 17 is cancelled.

In the Table, the item (5) shows an example in which a lift speed of the intake valve 4 is changed. For example, if the operation characteristics when the cam shaft 14A is driven at half the speed of the crank shaft is as shown with the solid line, the operation characteristics shown with the phantom line are realized by controlling the driving speed of the cam shaft 14A by the motor 12 in such a manner that the driving speed becomes faster than the basic speed during a course of opening and becomes slower than the basic speed during a course of closing. By giving such operation characteristics, it is possible to swiftly open the intake valve 4 to enhance the intake efficiency, and to reduce the speed when the intake valve 4 is closed, thereby moderating the impact at the time of sitting (when the intake valve 4 comes into contact with the valve seat).

The operation characteristics of the item (5) in the Table can, for example, be realized also by adjusting the profile of the cam 21A. However, if the maximum acceleration when the cam 21A is opened is increased, the minimum curvature radius of the cam 21A becomes small or a portion of the cam 21A is provided with a negative curvature in some cases. If the negative curvature is increased (i.e., if the curvature radius is reduced), it becomes necessary to reduce a radius of a grindstone which polishes a surface of the outer periphery of the cam 21A. However, if the radius of the grindstone becomes smaller, the life of the grindstone becomes shorter, and the adaptability for mass production of the cams 21A is deteriorated. Hence, the entire periphery of the profile of the cam 21A comprises the projecting curved surface as described above, and the opening speed of the intake valve 4 is increased by controlling the driving speed of the motor 12, thereby enhancing the intake efficiency while enhancing the adaptability for mass production of the cams 21A.

In the Table, the item (6) shows an example in which the intake valve 4 is opened and closed twice within a time period during which the intake valve 4 is normally opened and closed once. This operation characteristics are realized by controlling the rotation speed of the cam shaft 14A by the motor 12 to the same speed as the crank shaft. By giving such operation characteristics to the intake valve 4, the operation cycle of the internal combustion engine 1 can be switched between four cycles and two cycles. In the Table, the item (7) shows an example in which an internal EGR is realized by opening the intake valve 4 at an early stage. However, the lift amount is maintained at a small value for a while after the opening operation of the intake valve 4 is started. Such operation characteristics are realized in such a manner that after the speed of the cam shaft 14A is increased and the valve-opening timing of the intake valve 4 is shifted ahead, the rotation speed of the cam shaft 14A is reduced to a very small value or the cam shaft 14A is once stopped to suppress the increase of the lift amount, and this state is continued for a predetermine time period and then, the cam shaft 14A is increased in speed to increase the lift amount. In the Table, the item (8) shows an example in which the cam shaft 14A is stopped and the intake valve 4 is maintained in its closed state. The intake valve 4 can also be maintained in its opened state.

According to the valve-driving apparatus 11A, it is possible to give various operation characteristics to the intake valve 4 by combining the speed control of the motor 12, and the change of the lift amount and the operation angle by the valve-characteristics adjusting mechanism 17. Further, since the valve-driving apparatus 11A is independently provided for each cylinder 2 and the cam shaft 14A is also independent for each cylinder 2, it is possible to optimally set the operation characteristics of the intake valves 4 independently between the cylinders 2. With this, it is possible to enhance the flexibility of the operation characteristics of each intake valve 4 as compared with the conventional technique.

As shown in FIG. 2, in the valve-driving apparatus 11B of the exhaust valve 5, unlike the valve-driving apparatus 11A, the cam shaft 14B is provided with two cams 21B, the valve-characteristics adjusting mechanism 17 is omitted, and the two cams 21B directly drive the rocker arms 16, respectively. Other portions of the valve-driving apparatus 11B are the same as those of the valve-driving apparatus 11A, and explanation of the same portions is omitted. Like the cam 21A, the entire periphery of a profile of the cam 21B comprises a projecting curved surface. The operation characteristics of the exhaust valve 5 can variously be changed by variously changing the driving speed of the cam shaft 14B by the motor 12 of the valve-driving apparatus 11B. The valve-driving apparatus 11B is also independently provided for each cylinder 2, and the cam shaft 14B is also independent for each cylinder 2. Therefore, it is possible to optimally set the operation characteristics of the exhaust valve 5 independently for each cylinder 2. With this, it is possible to enhance the flexibility of the operation characteristics of each exhaust valve 5 as compared with the conventional technique.

Although the valve-characteristics adjusting mechanism 17 is omitted in the exhaust-side valve-driving apparatus 11B, the lift amount of the exhaust valve 5 can be changed by stopping the motor 12 while the cam 21B pushes the rocker arm 16 down and by reversely rotating the cam shaft 14B from the stop position. However, the maximum lift amount of this case is limited to the lift amount when the nose section 21b of the cam 21B (FIG. 2) gets over the rocker arm 16. The control of the lift amount by reversely rotating the motor 12 can be realized also in the intake-side valve-driving apparatus 11A as described above.

The valve-driving system 10 of this embodiment includes several features in addition to the basic structure for driving the intake valve 4 and the exhaust valve 5. Such features will be explained below. Various mechanisms or structures of the intake-side valve-driving apparatus 11A are also provided in the exhaust-side valve-driving apparatus 11B and perform the same effects as those of the valve-driving apparatus 11A unless otherwise specified.

(Concerning Torque Fluctuation Suppressing Mechanism)

Figure 8:
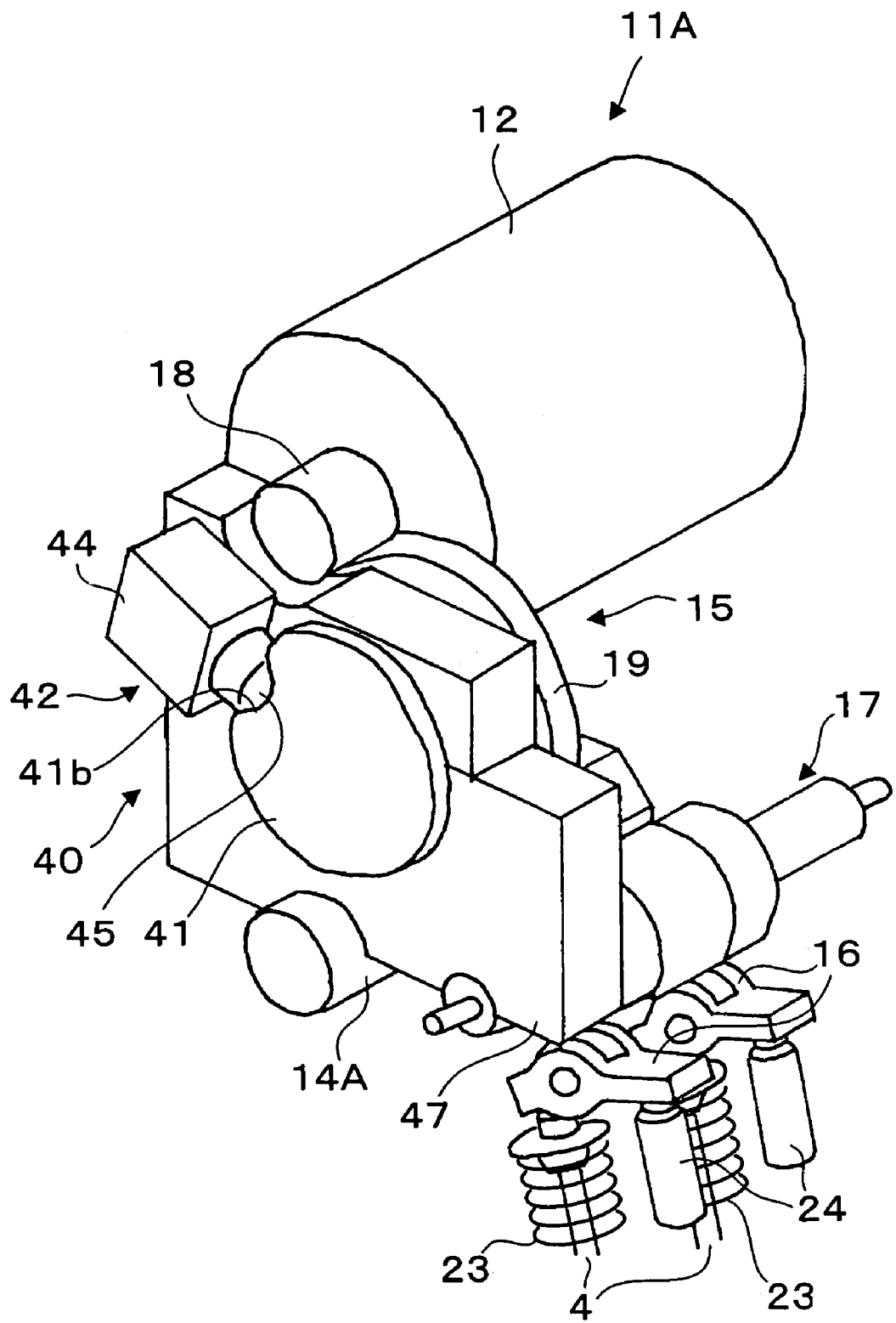
FIG. 8 is a perspective view of a torque fluctuation suppressing mechanism provided in the valve-driving apparatus shown in FIG. 2.
Figure 9:
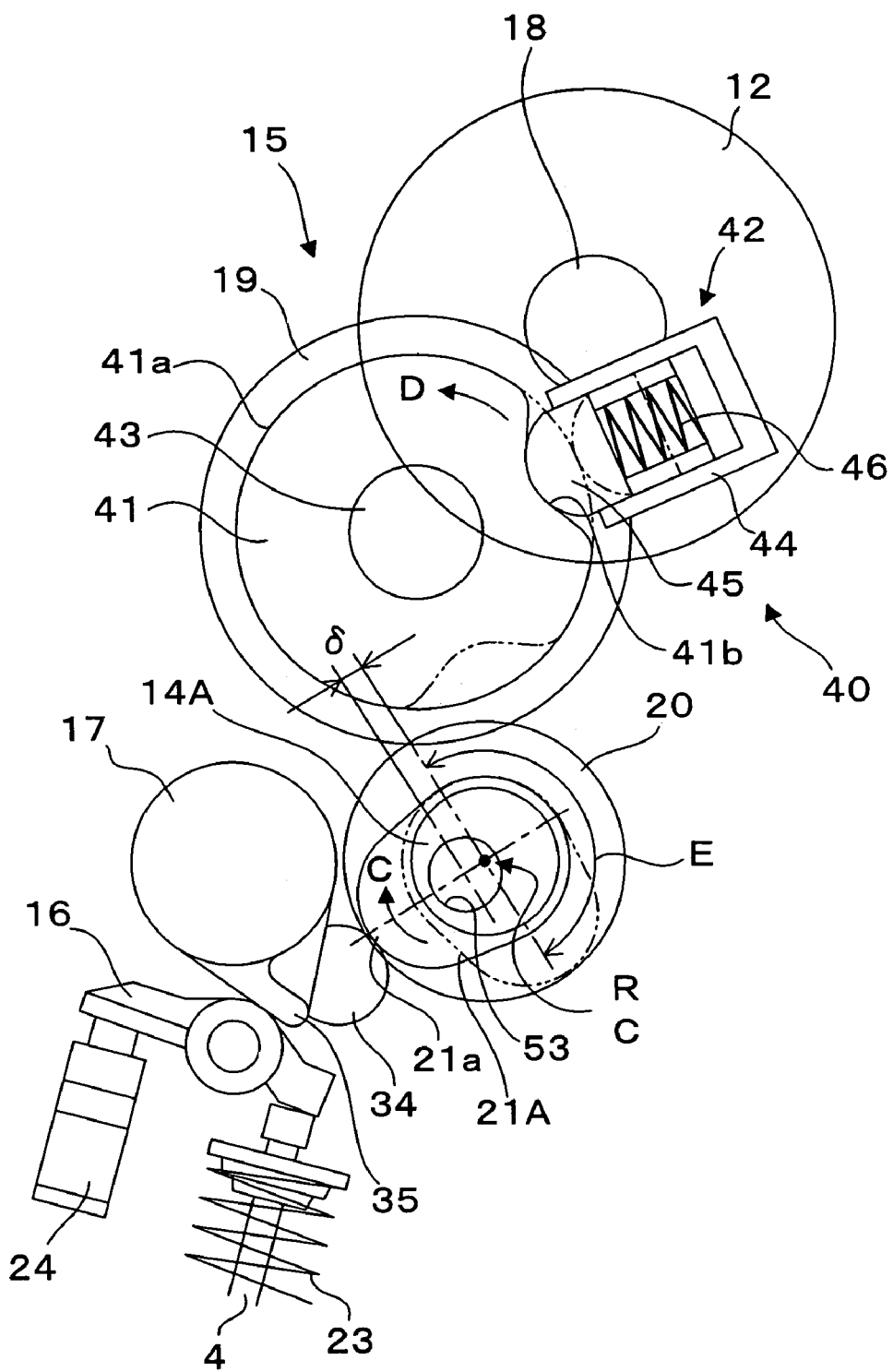
FIG. 9 shows a motion transmitting path extending from an electric motor to a valve in the valve-driving apparatus shown in FIG. 2.

As shown in FIGS. 8 and 9, the valve-driving apparatus 11A is provided with a torque fluctuation suppressing mechanism 40. The torque fluctuation suppressing mechanism 40 is provided because the cam shaft 14A is independent (i.e., the cam shaft 14A is partitioned) for each cylinder 2. If the nose section 21a of the cam 21A is pushed by reaction force caused by compression of the valve spring 23 (such force is referred to as compression reaction force, hereinafter), a torque is applied to the cam shaft 14A. In a general multi-cylinder internal combustion engine in which one cam shaft is commonly used between the cylinders, the single cam shaft is provided with cams, and the noses of the cams are deviated from one another in the circumferential direction. Therefore, torques acting on the cam shafts via the cams are cancelled and the fluctuation in torque is suppressed. However, since the cam shaft 14A is divided for each cylinder 2 in the valve-driving apparatus 11A, the variation in torque which is input to the cam 21A of any of the cylinders 2 cannot be cancelled by a torque which is input to the cam 21A of another cylinder 2. Thus, each valve-driving apparatus 11A is provided with the torque fluctuation suppressing mechanism 40.

The torque fluctuation suppressing mechanism 40 includes an opposed phase cam 41 and a torque-applying apparatus 42. The opposed phase cam 41 is supported by the intermediate shaft 43 coaxially with the intermediate gear 19, and can rotate integrally with the intermediate gear 19. An outer periphery surface of the opposed phase cam 41 is formed into a cam surface. The cam surface is formed with an arc section 41a which draws an arc coaxial with the axis of the intermediate shaft 43, and a recess 41b which is recessed toward the center from the arc section 41a.

The torque-applying apparatus 42 includes a housing 44 which is opposed to the outer periphery surface of the opposed phase cam 41, a lifter 45 accommodated in the housing 44 in a state in which the lifter 45 can project from the housing 44 toward the opposed phase cam 41, and a spring 46 which is compressed between the lifter 45 and the housing 44 to push the lifter 45 against the outer periphery surface of the opposed phase cam 41. The housing 44 is fixed to a cap 47 which rotatably supports the intermediate shaft 43. If a tip end of the lifter 45 is pushed against a slant of the recess 41b of the opposed phase cam 41 by a force of the spring 46, a torque in the same direction as or opposite direction from the driving direction of the intermediate gear 19 by the motor 12 is applied to the opposed phase cam 41.

As shown in FIG. 9, a mounting position of the opposed phase cam 41 in the circumferential direction with respect to the intermediate shaft 43 is adjusted such that when the lift amount of the intake valve 4 becomes maximum, i.e., when the nose section 21a of the cam 21 reaches the position shown with the solid line in FIG. 9 and gets over the roller follower 34, the lifter 45 is fitted into the recess 41b. By setting the relation between the phase of the cam 21 and the phase of the opposed phase cam 41 in this manner, the fluctuation of the driving torque of the cam shaft 14A generated by the compression reaction force of the valve spring 23 can be suppressed by a torque applied from the torque-applying apparatus 42 to the opposed phase cam 41. This point will be explained referring to FIG. 10.

Figure 10:
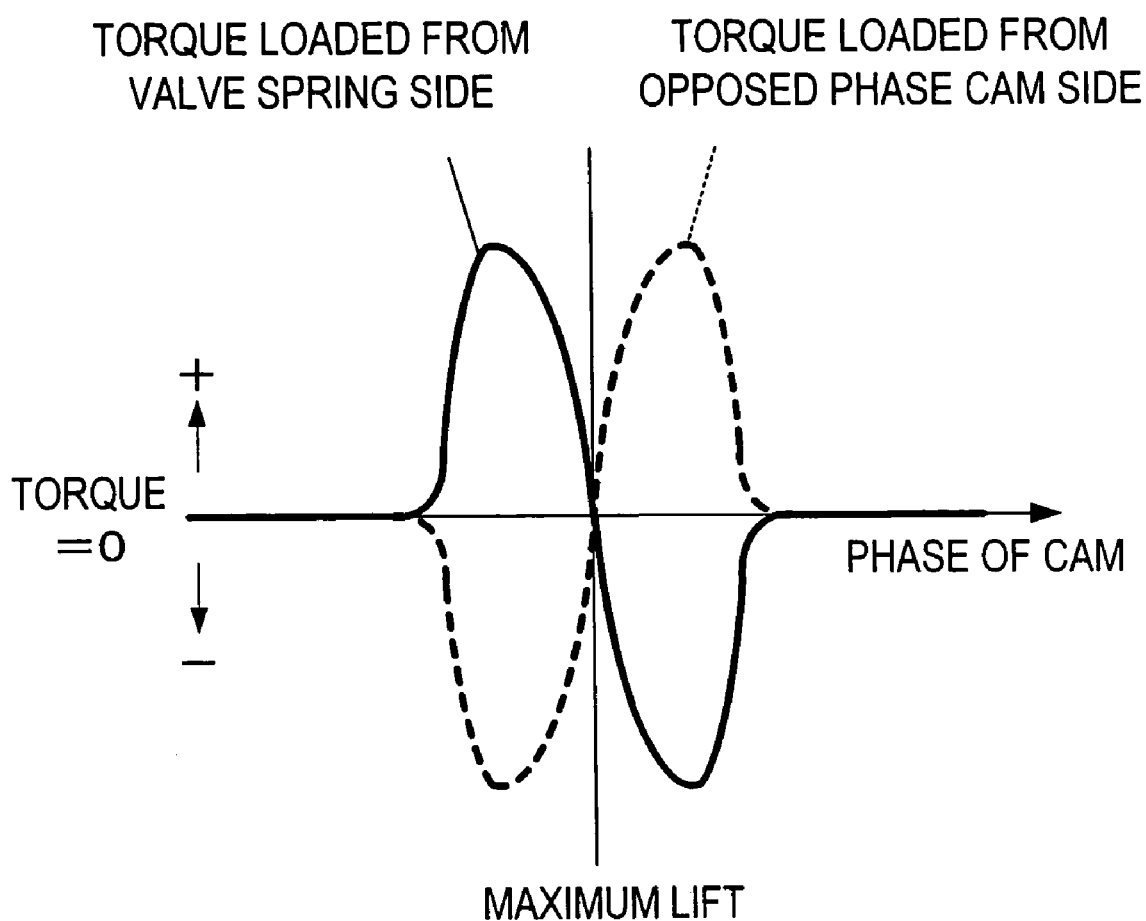
FIG. 10 shows a relation between a torque applied by a valve spring and a torque applied by the torque fluctuation suppressing mechanism.

FIG. 10 shows changes in magnitude and direction of torque applied from the valve spring 23 and the torque fluctuation suppressing mechanism 40 to the cam shaft 14A when the lateral axis shows the phase of the cam 21A and the vertical axis shows torque applied to an appropriate member on a driving path from the motor 12 to the cam 21A, e.g., the cam shaft 14A. Here, the lateral axis shows that torque=0, a torque applied into a direction opposite from the normal rotation direction of the cam shaft 14A (direction of arrow C in FIG. 9) is indicated with positive (+), and a torque applied into the normal rotation direction of the cam shaft 14A is indicated with negative (−). The vertical axis in FIG. 10 shows a position where the maximum lift amount is applied to the intake valve 4, and as the position is away from the vertical axis rightward, the cam 21A is deviated in the normal rotation direction from the position in FIG. 9, and as the position is away from the vertical axis leftward, the cam 21A is deviated in the reverse rotation direction from the position in FIG. 9.

First, as shown with the solid lines in FIG. 10, a torque applied from the valve spring 23 to the cam shaft 14A is substantially 0 at a position where the cam 21A gives the maximum lift amount. When the cam 21A is deviated in the reverse rotation direction from the position where the maximum lift amount is given, the torque has a positive value, and when the cam 21A is deviated in the normal rotation direction from the position where the maximum lift amount is given, the torque has a negative value. This is because that in a state in which the cam 21A is deviated in the reverse rotation direction from the position where the maximum lift amount is given, the compression reaction force of the valve spring 23 functions to reversely rotate the cam 21A, and in a state in which the cam 21A is deviated in the normal rotation direction from the position where the maximum lift amount is given, the compression reaction force of the valve spring 23 functions to normally rotate the cam 21A.

On the other hand, as shown with broken lines in FIG. 10, a torque applied from the opposed phase cam 41 to the cam shaft 14A is substantially 0 in the vicinity of a position where the cam 21A gives the maximum lift amount. When the position is deviated in the reverse rotation direction from a position where the cam 21A gives the maximum lift amount, the torque has a negative value, and when the position is deviated in the normal rotation direction from the position where the cam 21A gives the maximum lift amount, the torque has a positive value. If the lifter 45 is fitted into the recess 41b in a state in which the cam 21A is deviated in the reverse rotation direction from the position where the cam 21A gives the maximum lift amount, a force of the spring 46 pushes the opposed phase cam 41 in a direction corresponding to the normal rotation direction of the cam 21A (direction of arrow D in FIG. 9) through the lifter 45. If the lifter 45 is fitted into the recess 41b in a state in which the cam 21A is deviated in the normal rotation direction from the position where the cam 21A gives the maximum lift amount, the force of the spring 46 pushes the opposed phase cam 41 in a direction corresponding to the reverse rotation direction of the cam 21A through the lifter 45.

In this manner, a torque applied from the valve spring 23 and a torque applied from the opposed phase cam 41 act in the opposite directions. Therefore, the fluctuation in driving torque of the cam shaft 14A caused by a reaction force of the valve spring 23 can be suppressed by the torque fluctuation suppressing mechanism 40. If the rotation speed of the cam shaft 14A is increased, the inertia force of each member disposed on the driving path of the cam 21A is increased, and fluctuation in torque caused by the reaction force of the valve spring 23 is relatively reduced. On the other hand, in the torque fluctuation suppressing mechanism 40, as the rotation speed of the cam shaft 14A is increased, the force of the opposed phase cam 41 for pushing out the lifter 45 radially outward becomes great. With this, a torque applied from the spring 46 to the opposed phase cam 41 becomes small, and consistency between this torque reduction and reduction in torque applied from the valve spring 23 is maintained. In addition, since the vertical resistance applied between the lifter 45 and the opposed phase cam 41 becomes small, a friction resistance acting between the lifter 45 and the opposed phase cam 41 is reduced.

As explained above, by providing the torque fluctuation suppressing mechanism 40, the fluctuation in driving torque of the cam shaft 14A in each valve-driving apparatus 11A is suppressed. With this, necessary output of the motor 12 is reduced, and the motor 12 can be reduced in both its size and weight. Since two motors 12 are provided for each cylinder 2, the effect of the torque fluctuation suppressing mechanism 40 is remarkable especially when the number of cylinders 2 is increased. If the friction resistance generated in the valve-driving apparatus A is reduced at the time of high speed rotation, fuel consumption is suppressed.

The structures of the torque fluctuation suppressing mechanism 40 explained above is an example, and various modifications can be made. For example, the opposed phase cam 41 may be provided coaxially with the motor gear 18 or the cam-driving gear 20 instead of the intermediate gear 19. What is necessary is that a torque can be applied from the torque fluctuation suppressing mechanism 40 to any of positions of the rotation transmitting path from the motor 12 to the cam shaft 14A.

(Concerning Supporting Structure of Cam Shaft)

As shown in FIG. 3, the cam shaft 14A is provided at its opposite ends with shaft supporting sections 50 which can rotate integrally with the cam 21A. The shaft supporting sections 50 are fitted into bearings (not shown), so that the cam shaft 14A is rotatably supported on the cylinder head. The shaft supporting section 50 is provided at its outer periphery surface with an enlarged section 51 which extends over the entire width of the shaft supporting section 50, and a reduced section 52 which is narrower than the enlarged section 51.

As shown in FIG. 9, the enlarged section 51 is formed in a predetermined range E which is opposite from the nose section 21a. The predetermined range E is set to substantially 180° in FIG. 9. In case that the enlarged section 51 is provided in this manner, when the cam 21A moves to a position where the maximum lift amount is given to the intake valve 4, a load applied to the cam shaft 14A in the direction of arrow G by a reaction force of the valve spring 23 is received by a bearing of the cam shaft 14A through the enlarged section 51 of the shaft supporting section 50.

When the enlarged section 51 of the shaft supporting section 50 of the cam shaft 14A comes into contact with the bearing, the contact range becomes greater than that when the reduced section 52 comes into contact with the bearing, and a friction resistance acting between the cam shaft 14A and its bearing becomes greater. On the other hand, as shown in FIG. 10, if the cam 21A is driven to a position in the vicinity of a position where the maximum lift amount is given to the cam 21A, a torque of the cam shaft 14A generated by the reaction force of the valve spring 23 is varied toward 0 irrespective of the rotation direction of the cam 21A. By increasing the friction resistance in correspondence with reduction in such a torque, a braking effect is generated in the rotation of the cam shaft 14A, and the fluctuation in driving torque of the cam shaft 14A can be reduced.

It is possible to adjust the friction resistance between the cam shaft 14A and the bearing by changing the friction coefficient on a surface of the shaft supporting section 50 instead of changing the supporting range (area) of the shaft supporting section 50. The friction coefficient can be changed by physical or chemical surface processing which increases or reduces the friction resistance, or by means which fixes members having different friction resistance.

(Concerning Adjustment of Mass Balance of Cam Shaft)

As shown in FIG. 9, the cam shaft 14A is formed with an oil-supply hole 53 for supplying lubricant oil to the cam 21A. The oil-supply hole 53 is eccentric toward the nose section 21a of the cam 21A with respect to a rotation center RC of the cam shaft 14A. A reason why the oil-supply hole 53 is eccentric is as follows.

In the valve-driving apparatus 11A, since the cam shaft 14A is independent for each cylinder 2, unbalance of the mass of the cam 21A concerning the rotation center RC of the cam shaft 14A cannot be cancelled by the unbalance of the mass of the cam 21A of other cylinder 2, and a barycenter of the cam shaft 14A cannot be aligned with the rotation center RC. When a weight for keeping the balance is mounted on the opposite side from the nose section 21a with respect to the rotation center RC, the moment of inertia of the entire cam shaft 14A is increased, and the necessary output of the motor 12 is increased. Thereupon, by decentering the oil-supply hole 53, the unbalance of the mass of the cam shaft 14A around the rotation center RC is reduced without increasing the moment of inertia. By suppressing the unbalance of the mass in this manner, it is possible to reduce the necessary output of the motor 12 and to reduce the motor 12 in its size and weight.

The unbalance of the mass of the cam shaft 14A can also be realized by means other than the method for decentering the oil-supply hole 53. For example, it is possible to correct the unbalance of the mass of the cam shaft 14A around the rotation center by means of reducing a width of the cam 21A on the side of the nose section 21a, or forming a notch in a surface of the cam 21A closer to the nose section 21a than the rotation center RC of the cam shaft 14A.

(Concerning Installation of Negative Pressure Generating Apparatus)

Figure 11:
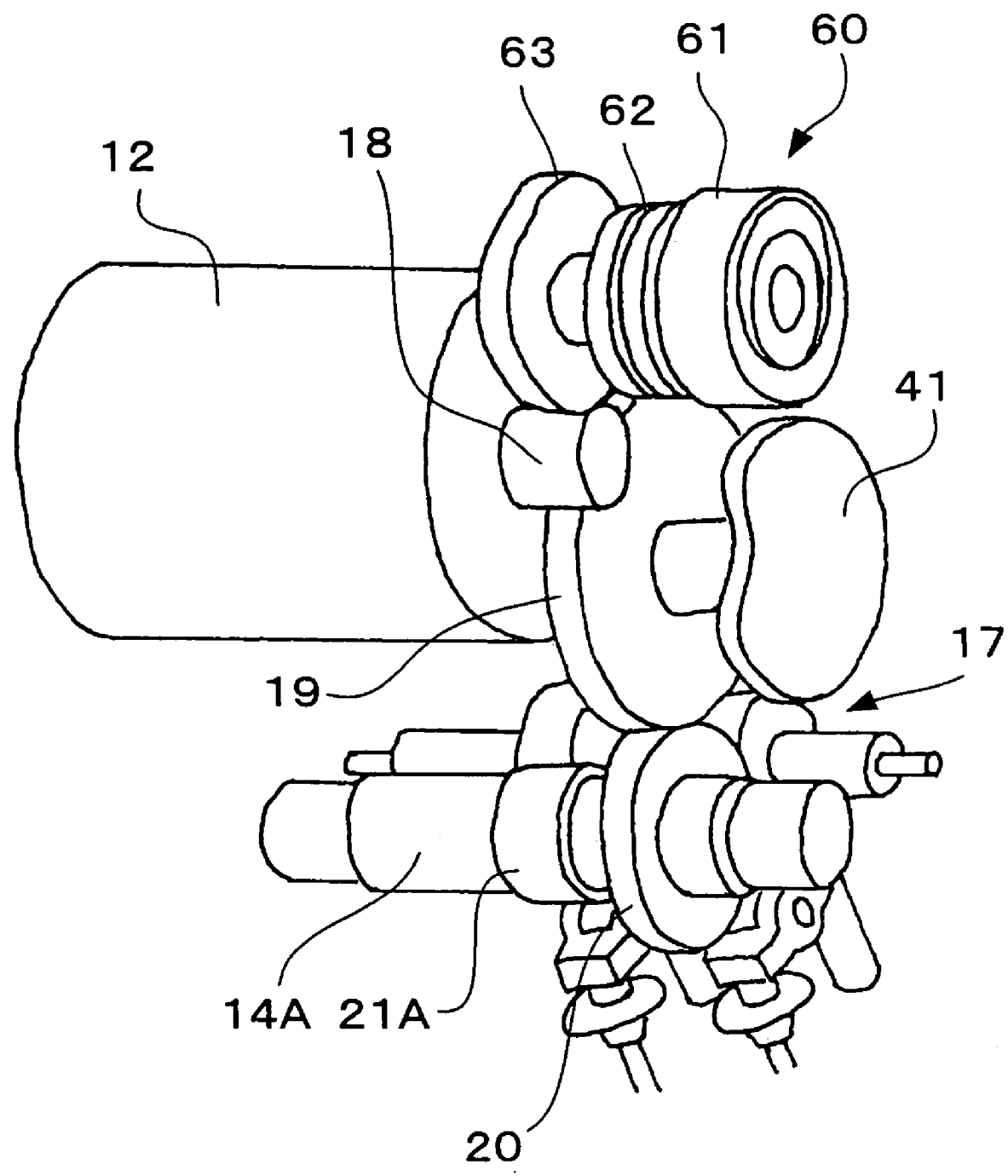
FIG. 11 is a perspective view showing a negative pressure generating apparatus mounted on the valve-driving apparatus.

As shown in FIG. 11, one of the valve-driving apparatuses 11A (it may be the valve-driving apparatus 11B) of the valve-driving system 10 is provided with a negative pressure generating apparatus 60. The negative pressure generating apparatus 60 is suitably used when the internal combustion engine 1 cannot obtain sufficient negative pressure in the intake system. For example, the negative pressure generating apparatus 60 is provided when a throttle opening at the time of low speed is relatively largely controlled as in a cylinder direct injection type internal combustion engine, or when a throttle valve is omitted and an amount of intake air is adjusted by controlling the lift amount of the intake valve or the like. The negative pressure generating apparatus 60 also includes a structure suitable for a case in which starting igniting air is charged into the cylinder 2 required when a force for starting the internal combustion engine 1 is obtained by combustion of air-fuel mixture in the cylinder 2 without using a starter motor. Details of the negative pressure generating apparatus 60 will be explained below.

Figure 12:
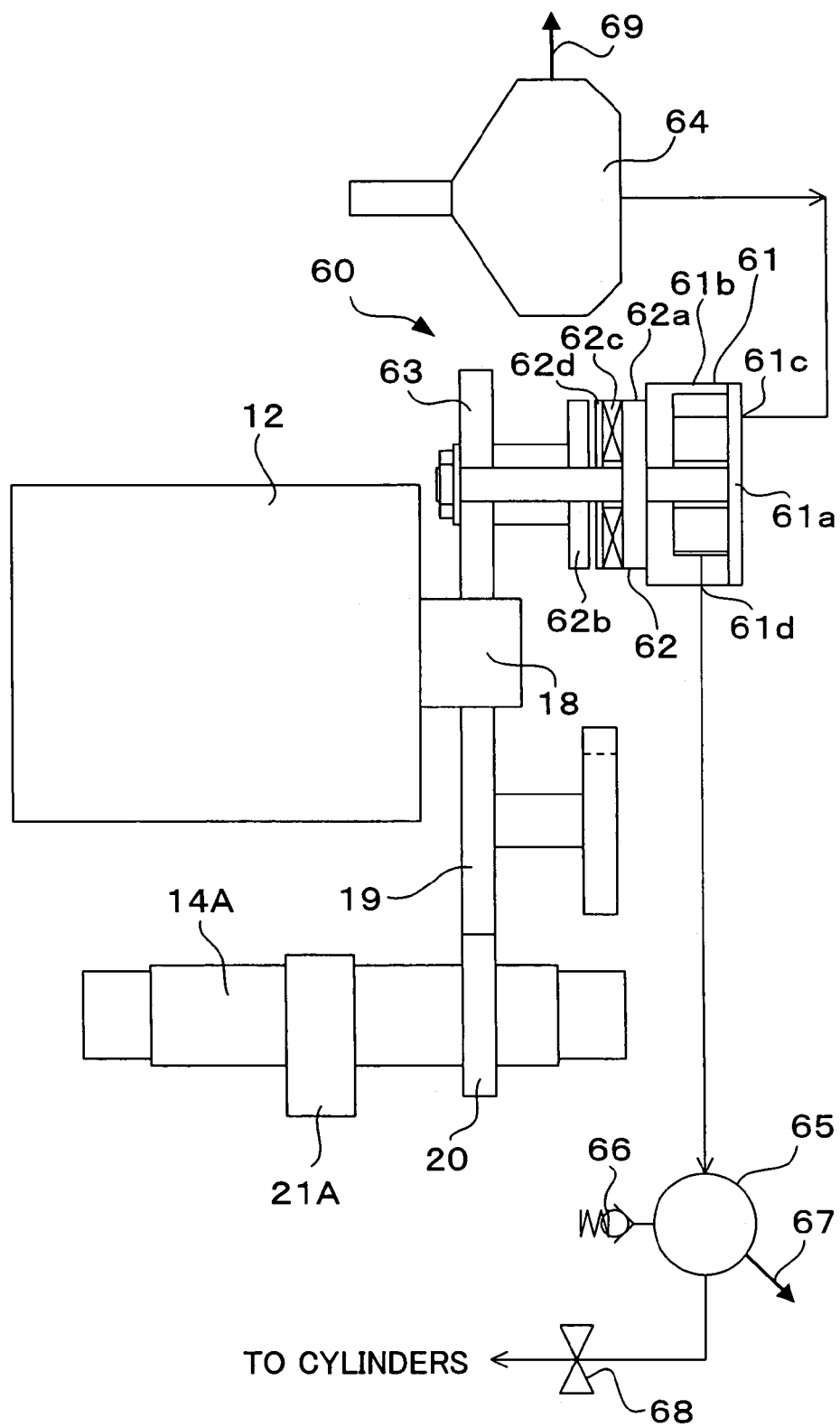
FIG. 12 shows a structure of the negative pressure generating apparatus.

The negative pressure generating apparatus 60 shown in FIG. 11 includes a vacuum pump 61, a clutch 62 and a pump gear 63. As shown in FIG. 12, a rotating section 61a of the vacuum pump 61 is connected to a shaft flange 62a of the electromagnetic clutch 62 such that the rotating section 61a rotates integrally with the shaft flange 62a. A pump housing 61b of the vacuum pump 61 is fixedly supported on the cylinder head of the internal combustion engine 1 for example. The pump gear 63 meshes with the motor gear 18, and the pump gear 63 can rotate on the shaft flange 62a and can move in the axial direction integrally with thedisk 62b of the electromagnetic clutch 62. An electromagnetic coil 62c and an armature 62d are integrally mounted on the shaft flange 62a. If the electromagnetic coil 62c is excited, the armature 62d and the disk 62b are adsorbed, a rotation transmitting path from a pump gear 64 to the pump rotating section 61a is connected, and the vacuum pump 61 is driven by the motor 12.

An intake port 61c of the vacuum pump 61 is connected to a brake booster 64, and an exhaust port 61d of the vacuum pump 61 is connected to an accumulator tank 65. Provided in the accumulator tank 65 are a relief valve 66 which limits a pressure in the tank to a predetermined value or lower, and a pressure sensor 67 which detects the pressure in the tank. The accumulator tank 65 is connected to the cylinders 2 of the internal combustion engine 1 through a control valve 68. A pressure sensor 69 for detecting a pressure is also provided in the brake booster 64.

According to the negative pressure generating apparatus 60, when the pressure in the brake booster 64 detected by the pressure sensor 69 becomes equal to or higher than a predetermined value or when a pressure in the accumulator tank 65 detected by the pressure sensor 67 becomes equal to or lower than a predetermined value, the electromagnetic clutch 62 is excited so that the motor 12 drives the vacuum pump 61. With this structure, a negative pressure in the brake booster 64 can be maintained within an appropriate range, and a pressure equal to or higher than the predetermined level can be accumulated in the accumulator tank 65. If the control valve 68 is opened when the internal combustion engine 1 is started, air which is required for starting the internal combustion engine 1 can be changed into the cylinders 2.

The vacuum pump 61 of the negative pressure generating apparatus 60 can be driven by either one of the valve-driving apparatuses 11A and 11B which constitutes the valve-driving system 10. However, if a vacant space in the vicinity of the motor 12 is taken into account, it is desirable that the rotation is taken out from the motor 12 of the valve-driving apparatus 11A or 11B disposed on the outermost side with respect to the arrangement direction of the cylinders 2 to the vacuum pump 61 (see FIG. 14). When the internal combustion engine 1 carries out a cylinder cutoff operation in which combustion in one or some of the cylinders 2 is paused, it is preferable to provide the negative pressure generating apparatus 60 with a valve-driving apparatus 11A or 11B corresponding to a cylinder 2 whose combustion is not paused.

According to the negative pressure generating apparatus 60, since the vacuum pump 61 is driven by the motor 12 which drives the intake valve 4 or the exhaust valve 5, there is a merit that it is unnecessary to separately provide a driving source for generating the negative pressure or charging air into the cylinder 2. Further, since the negative pressure is generated and air is charged (or accumulated) through the common vacuum pump 61, the number of parts is reduced as compared with a case in which these procedures are carried out by another pump 61, and a space required for mounting the parts is also reduced.

A pump for generating a negative pressure and a pump for accumulating a pressure in the accumulator tank 66 may be provided separately, and these pumps may be driven by the same electric motor 12 or different electric motors 12. A pump may be provided for one of purposes of generating a negative pressure and charging a pressure into the accumulator tank.

(Concerning Mounting Structure of Motor)

Figure 13:
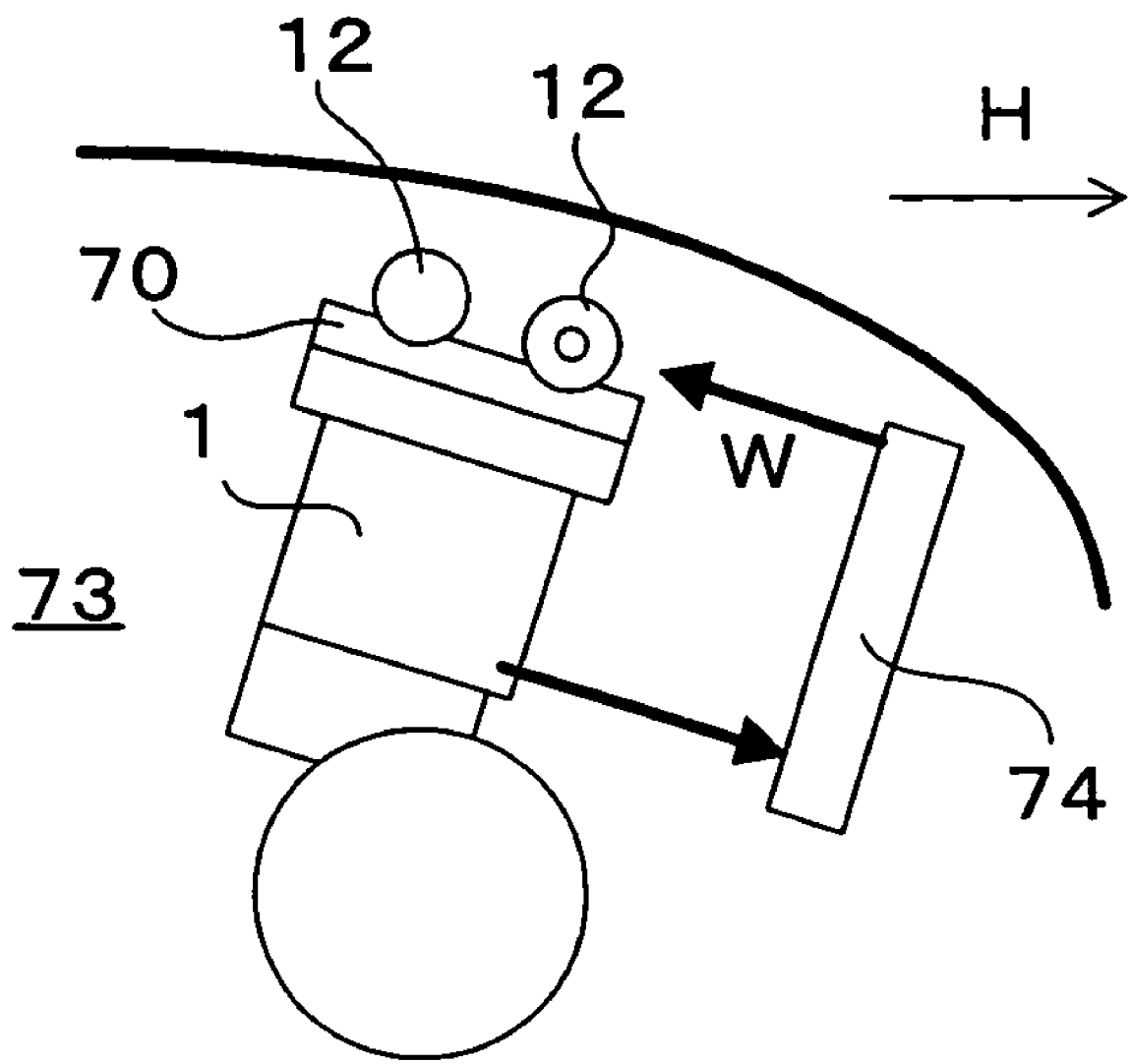
FIG. 13 shows a state in which an internal combustion engine provided with the valve-driving system of this invention is mounted in an engine room of a vehicle.
Figure 14:
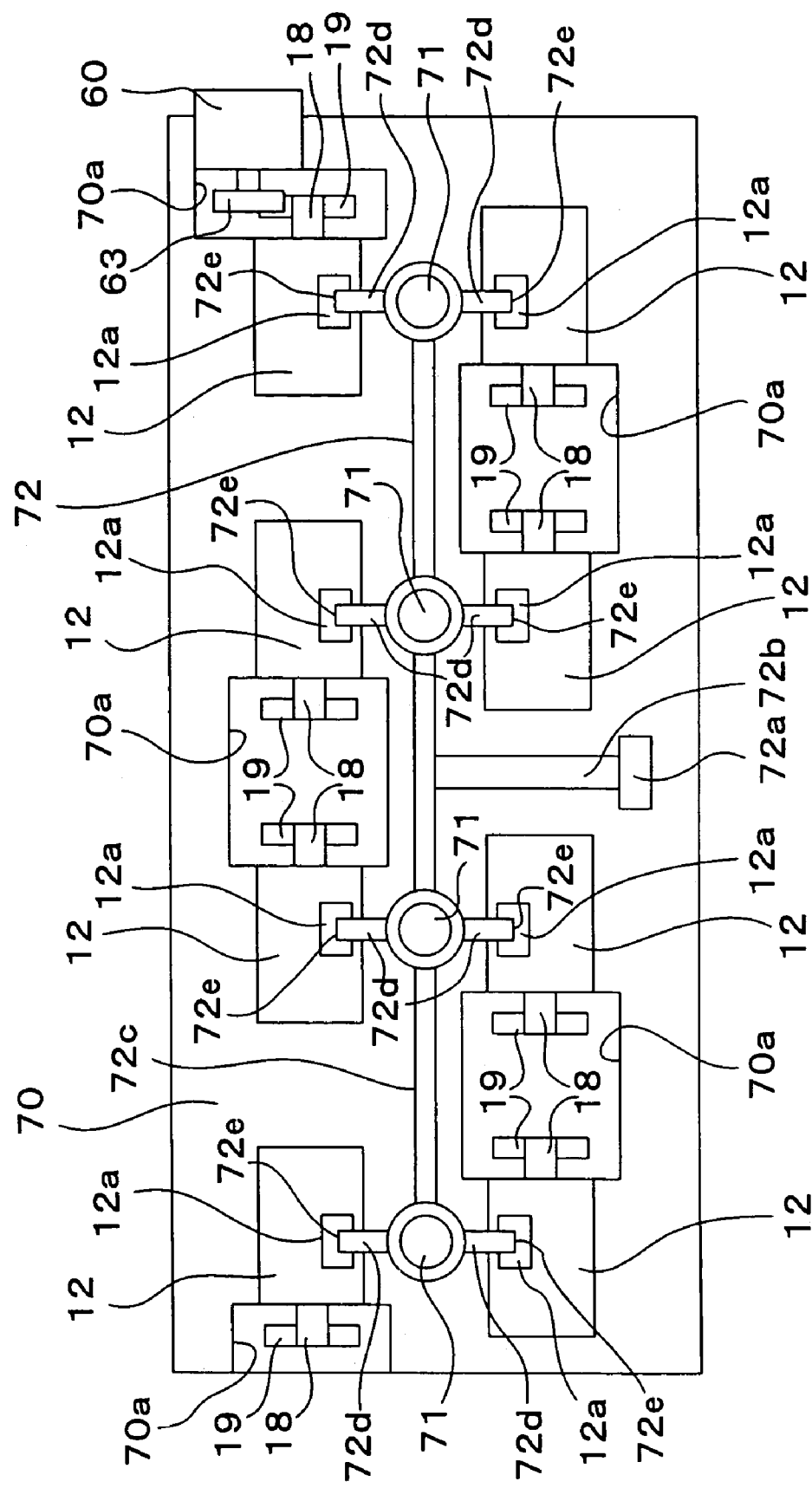
FIG. 14 shows a structure of the electric motor disposed on an external upper surface of a head cover.
Figure 15:
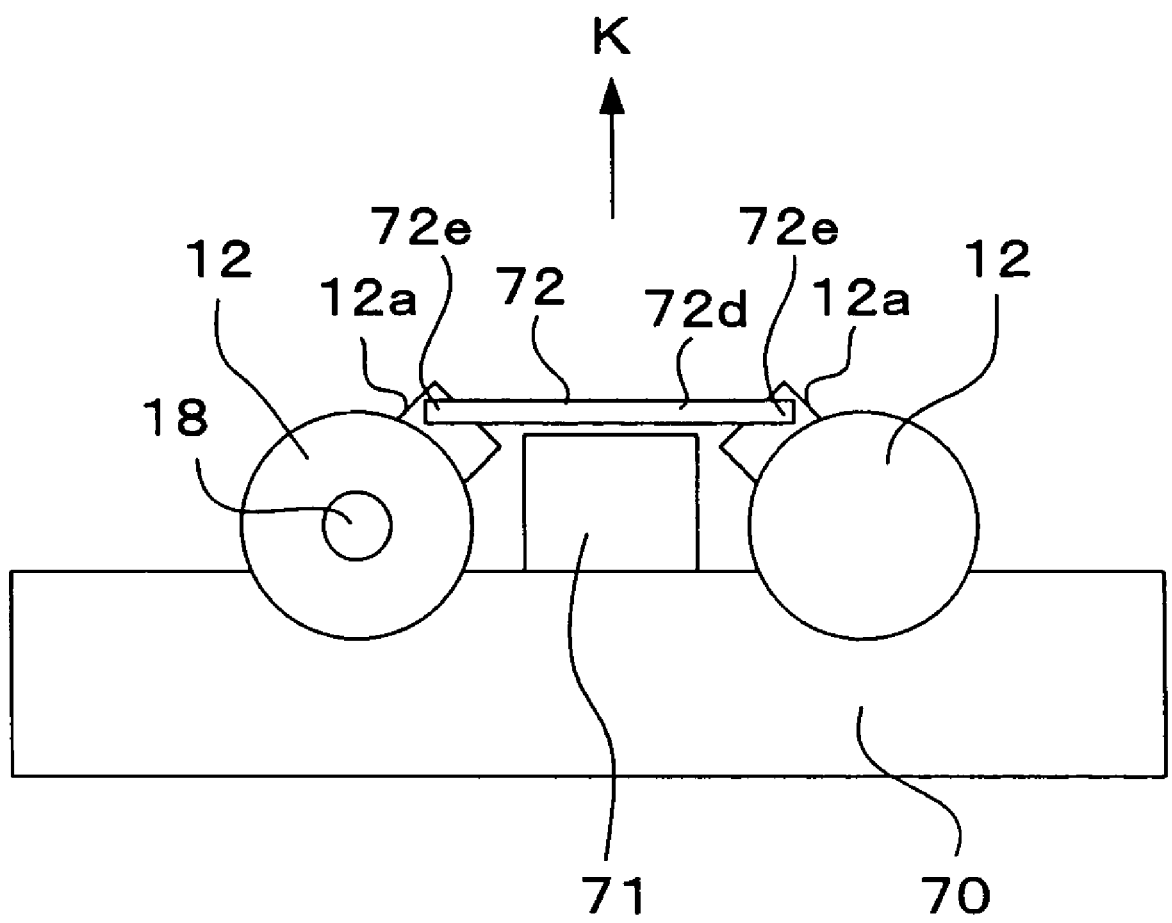
FIG. 15 shows the structure shown in FIG. 14 viewed from a side of the head cover.

As shown in FIG. 13, the motor 12 is mounted on an upper surface of an exterior of the head cover 70 of the internal combustion engine 1. FIG. 14 is a plan view showing a layout of the motor 12 on the head cover 70, and FIG. 15 is a side view thereof. In FIG. 14, the lateral direction corresponds to an arrangement direction of the cylinders 2. As shown in FIGS. 14 and 15, the motors 12 of the intake-side and the exhaust-side are opposed to each other with ignition coils 71 provided for the cylinders 2 on the head cover 70 interposed therebetween. The ignition coil 71 supplies high voltage current to an ignition plug (not shown). Mechanism sections from the cam shafts 14A and 14B of the valve-driving apparatuses 1A and 11B to the rocker arm 16 are accommodated in the head cover 70. An upper portion of the intermediate gear 19 which constitutes the gear train 15 projects upward from an opening 70a of the head cover 70 and meshes with the motor gear 18 of the motor 12.

As shown in FIG. 15, each motor 12 has a connector 12a which establishes electrical connection. The connector 12a is mounted to the head cover 70 in a state in which the connector 12a is inclined toward a center of the cylinder 2 with respect to a direction oriented directly above of the head cover 70 (direction of arrow K in FIG. 15), i.e., toward the ignition coil 71. As shown in FIG. 14 also, each connector 12a is connected to a motor bus bar 72 as a wiring member. The motor bus bar 72 includes an aggregation terminal 72a which is connected to an inverter circuit (not shown) for driving the motor, a trunk line 72b extending from the aggregation terminal 72a toward a center of the head cover 70, a distribution section 72c intersecting with the trunk line 72b and extending along the arrangement direction of the cylinders 2 between the intake-side motors 12 and the exhaust-side motors 12, and branch lines 72d extending from the distribution section 72c toward each motor 12. The trunk line 72b, the distribution section 72c and the branch lines 72d are configured by providing copper pattern wiring on a substrate having appropriate rigidity. The aggregation terminal 72a and the individual terminal 72e (the tip end of each branch lines 72d) are electrically connected by means of the pattern wiring.

After all the motors 12 are mounted on the head cover 70, the motor bus bar 72 is mounted on the head cover 70 such that tip ends of the branch lines 72d are fitted into the connectors 12a of the motors 12, thereby electrically connecting the aggregation terminal 72a and the connectors 12a of all the motors 12. By mounting the connector of the wiring from the inverter circuit (not shown) to the aggregation terminal 72a, the electric connection to the motor 12 is completed.

As shown in FIG. 13, the internal combustion engine 1 is mounted in an engine room 73 provided in a front portion of a vehicle in a so-called lateral attitude in which the arrangement direction of the cylinders 2 coincides with the lateral direction of the vehicle. In order to make the motor 12 expose efficiently to cooling air taken into the engine room 73 when the vehicle runs forward (in direction of arrow H), the internal combustion engine 1 is mounted on the engine room 73 in a front-inclining state in which the head cover 70 is displaced forward of the vehicle than the crank chamber.

Figure 16:
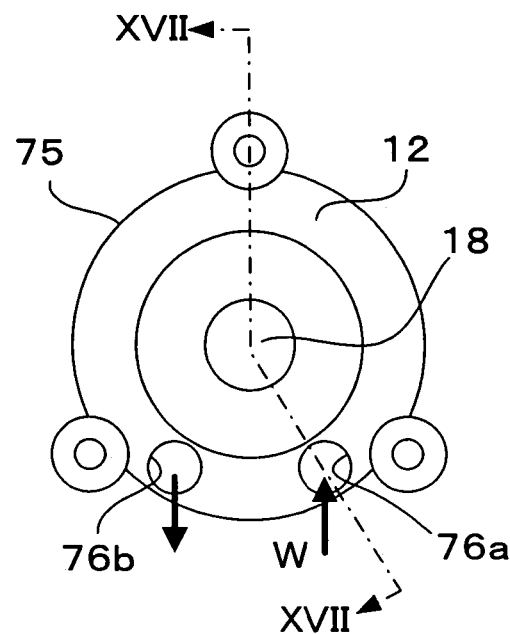
FIG. 16 shows a structure for introducing cooling water into the electric motor.
Figure 17:
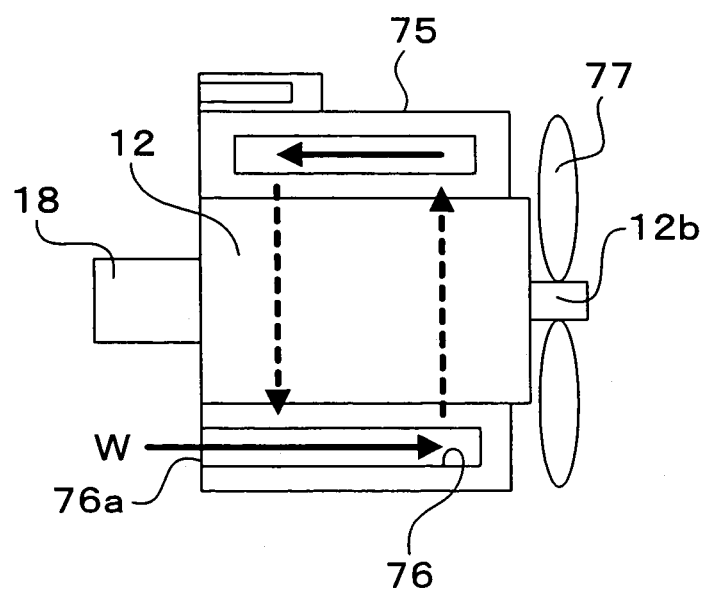
FIG. 17 is a sectional view taken along the line XVII-XVII in FIG. 16.

As shown in FIGS. 16 and 17, a water jacket 75 is mounted on an outer periphery of each motor 12. The water jacket 75 is formed with a cooling water passage 76. The cooling water passage 76 is uniformly formed in the periphery of the motor 12, its inlet 76a is connected to a cooling water outlet of a radiator 74 (see FIG. 13) which absorbs heat from the cooling water of the internal combustion engine 1, and an outlet 76b of the cooling water passage 76 is connected to a cooling water inlet of the internal combustion engine 1. That is, most cooled cooling water W after being cooled by the radiator 74 and before being heated by the internal combustion engine 1 is introduced around the motors 12. With this, the cooling effect of the motor 12 can be enhanced. As shown in FIG. 17, a fan-driving shaft 12b which rotates integrally with the output shaft of the motor 12 projects from a rear end of each motor 12 (opposite to the end on which the motor gear 18 is mounted), and a cooling fan 77 is mounted on the fan-driving shaft 12b. With this, each motor 12 is cooled by the rotation of the motor 12 itself.

According to this structure, it is possible to suppress the temperature rise of the motor 12 caused by heat of the engine room 73 and heat of the motor 12 itself, and to reduce the motor 12 in its size while sufficiently securing the output of the motor 12. The motor bus bar 72 is exposed from the head cover 70, and a distance of the wiring from the aggregation terminal 72a to the connector 12a of each motor 12 is relatively short. Therefore, heat loss and heat generation in the wiring portion concerning the motor 12 are suppressed, and the actual output of the motor 12 is increased.

Lubricant oil is supplied to mechanism portions from the cam shafts 14A and 14B accommodated in the head cover 70 to the intake valve 4 or the exhaust valve 5, and the head cover 70 functions as a cover which prevents the lubricant from scattering. Thus, when the motors 12 are disposed outside the head cover 70, there is an effect that the motors 12 are protected against the lubricant oil.

It is necessary to provide the water jacket 75 with an opening, a notch or a slit for exposing the connector 12a of the motor 12. The cooling water passages 76 of the motors 12 may be connected to the radiator 74 in series or in parallel.

Although the valve-driving apparatuses 11A and 11B are provided for each cylinder 2 in the above embodiment, the cam shafts 14A, 14B may be used commonly between two or more cylinders 2 in which the opening timings of the intake valve 4 and the exhaust valve 5 are not overlapped, and the intake valve 4 and the exhaust valve 5 may be driven by the same motor 12. For example, in the case of serial four-cylinder internal combustion engine 1, the electric motor 12 and the cam shafts 14A, 14B can commonly be used between cylinders 2 in which the valve-opening timings of the intake valve 4 and the exhaust valve 5 are deviated through a crank angle of 360°.

Each electric motor 12 may not be completely exposed from the head cover 71, and a portion of each electric motor 12 may be exposed from the head cover 71. Even with the latter structure in which a portion of the motor 12 is exposed, the wiring structure utilizing the cooling effect and the bus bar 72 can be applied.

Second Embodiment

FIGS. 18A and 18B and 19A to 19C show a valve-driving apparatus 11C according to the second embodiment of the present invention. This valve-driving apparatus 11C drives the intake valve 4 or the exhaust valve 5 utilizing a link. An example for driving the intake valve 4 will be explained here, but the same structure may be used for driving the exhaust valve 5.

The valve-driving apparatus 11C includes the electric motor 12 as a driving source, and a power transmission mechanism 100 which converts the rotation motion of the motor 12 into the opening and closing motion of the intake valve 4. The power transmission mechanism 100 includes an eccentric plate 101 as a rotation member which is rotated by the motor 12, a first link 103 which is rotatably connected to a connection position which is eccentric from the rotation center of the eccentric plate 101 through a connection pin 102, and a second link 105 which is rotatably connected to an upper end of the intake valve 4 through a connection pin 104. The eccentric plate 101 and the first link 103 function as a crank mechanism which converts the rotation motion of the motor 12 into reciprocating motion, and a combination of the first link 103 and the second link 105 constitutes a link section.

The first link 103 is provided at its tip end with a guide cylinder 106, and a coil spring 107 and a slider 108 which press the coil spring 107 are accommodated in the guide cylinder 106. The coil spring 107 is accommodated in the guide cylinder 106 in a somewhat compressed state such that the slider 108 is pushed against an end surface of the guide cylinder 106. A tip end of the second link 105 is inserted into the guide cylinder 106 and is connected to the slider 108. With this structure, the power transmission mechanism 100 is constituted as a slider crank mechanism which is one of link mechanisms.

The operation of the valve-driving apparatus 11C will be explained next. First, when a connection position between the eccentric plate 101 and the first link 103 is in a reference position shown with a phantom line in FIG. 19A, if the intake valve 4 comes into intimate contact with the valve seat VS and the slider 108 abuts against the upper end in the guide cylinder 106, it is possible to push the slider 108 down by the guide cylinder 106 and to transmit its movement to the intake valve 4 through the second link 105 to open the intake valve 4 by rotating the eccentric plate 101 from the reference position in the clockwise direction in FIGS. 19A, 19B and 19C (direction of arrow CW). The lift amount L of the intake valve 4 from the valve seat VS in this case has a correlation with a rotation angle θa of the eccentric plate 101 from the reference position, and if the rotation angle θa is increased, the lift amount L is also increased as shown in FIG. 19B.

When the eccentric plate 101 is rotated in the counterclockwise direction from the reference position (direction of arrow CCW) as shown in FIG. 19C, the slider 108 is away from the guide cylinder 106 while compressing the coil spring 107. Thus, the eccentric plate 101 is rotated in the counterclockwise direction (direction of arrow CCW) in a state in which the intake valve 4 is held pressed against the valve seat VS by a force of the valve spring 23. Such rotation in the counterclockwise direction can be continued until a distance between the connection pins 102, 104 coincides with a distance between the connection pins 102, 104 at the reference position. In other words, when the center of the connection pin 102 is moved to a straight line (shown with a dotted line in FIG. 10) connecting the rotation center of the eccentric plate 101 and a center of the connection pin 104, the distance between the connection pins 102, 104 becomes maximum. Therefore, if this position is defined as an polar position and the rotation angle of the eccentric plate 111 from the polar position to the reference position is defined as θb, the slider 108 slides with respect to the guide cylinder 106 until the eccentric plate 101 rotates by the equal angle θb from the polar position in the counterclockwise direction, and the intake valve 4 can be held in a state in which the intake valve 4 is in intimate contact with the valve seat VS by the force of the valve spring 23 (in a state in which lift amount L is equal to 0). It is necessary to determine a length of the guide cylinder 106 such that a height of the coil spring 107 when the connection pin 102 moves to the polar position becomes greater than a solid height of the coil spring 107.

As apparent from the above description, in the valve-driving apparatus 11C shown in FIGS. 18A and 18B and 19A to 19C, by reciprocating the eccentric plate 101 by the motor 12 in a range of θa in the clockwise direction and in a range of 2θb in the counterclockwise direction from the reference position, it is possible to open and close the intake valve 4 by the lift amount L corresponding to the rotation angle θa. Further, by changing the rotation speed of the motor 12 when the intake valve 4 is opened and closed, the operation angle of the intake valve 4 can also be changed.

Since there is provided the range in which the motor 12 is rotated in a state in which the intake valve 4 is held closed (range of θb in leftward and rightward from the polar position), the motor 12 can reciprocate and rotate (swing) in relatively wide range. Thus, the sliding speed of a slide portion from the eccentric plate 101 to the intake valve 4 (slide portion between the bearings of the pins 102, 104 and the slider 108) increases, an oil film formation of the slide portion is facilitated, and friction and wear are reduced. Therefore, a torque which is to be generated by the motor 12 is reduced, and it becomes easy to control the speed of the motor 12.

Although the valve-driving apparatus 11C drives the single intake valve 4 in the above explanation, the valve-driving apparatus 11C can drive a plurality of intake valves 4 or exhaust valves 5 which are associated with the same cylinder 2. Like the valve-driving apparatuses 11A and 11B in the first embodiment, a plurality of valve-driving apparatuses 11C are used for one internal combustion engine 1 for driving the intake valves 4 or the exhaust valves 5 of different cylinders 2.

Third Embodiment

Figure 18A:
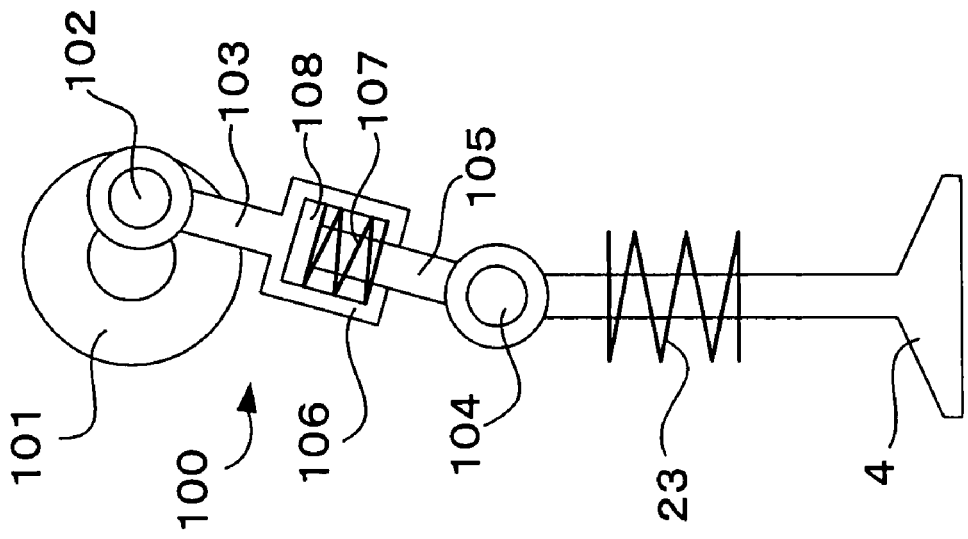
FIGS. 18A and 18B show the valve-driving apparatus which opens and closes a valve utilizing a link, where
Figure 18B:
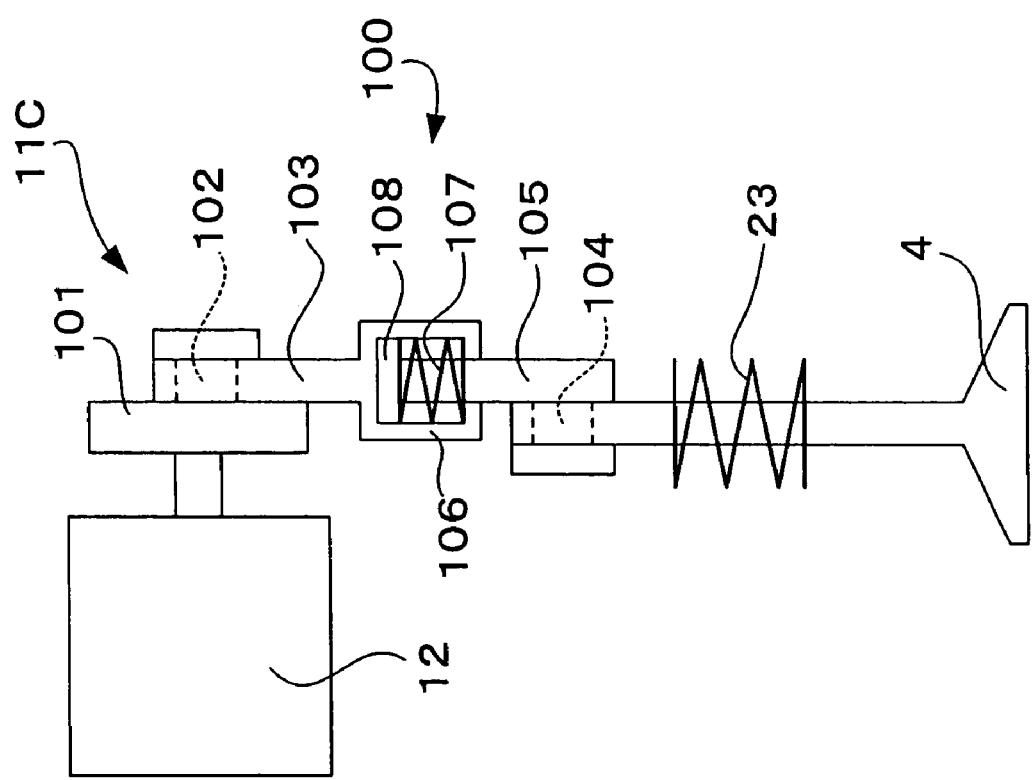
Figure 20A:
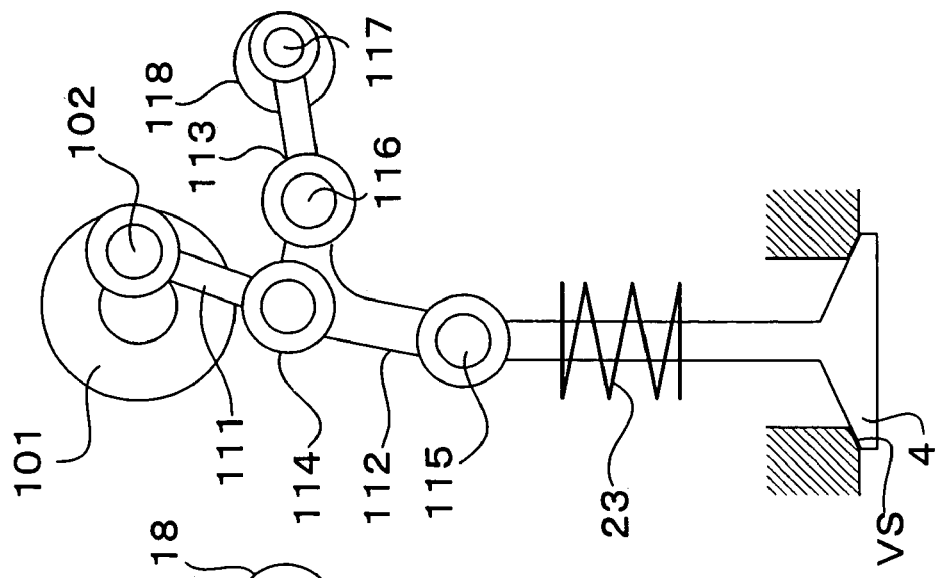
FIGS. 20A, 20B and 20C show another valve-driving apparatus which opens and closes a valve utilizing a link, where
Figure 20B:
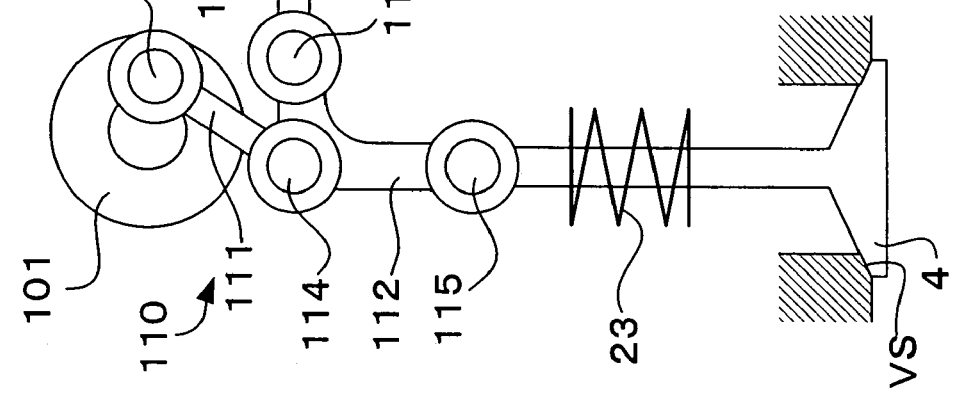
Figure 20C:
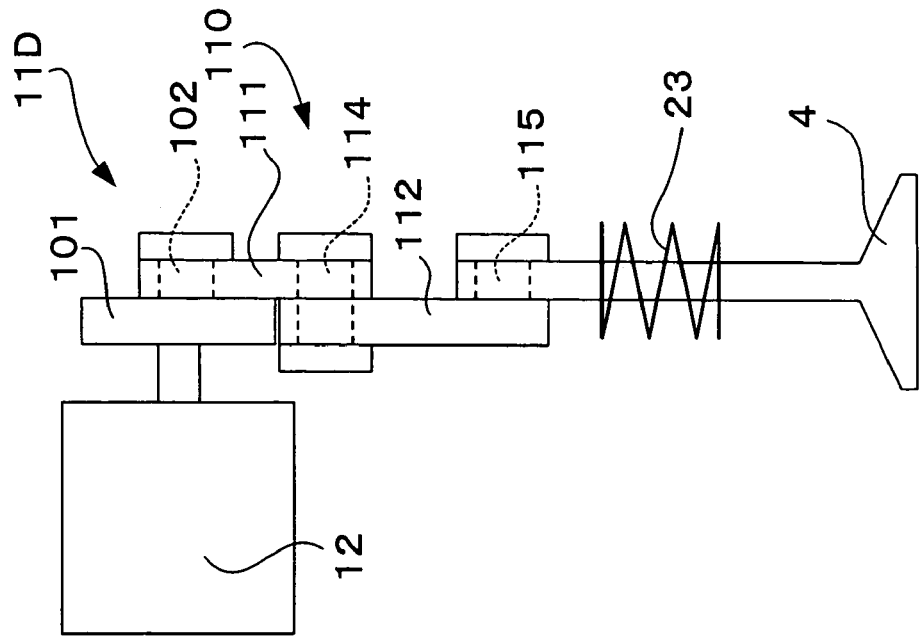

FIGS. 20A, 20B and 20C show a valve-driving apparatus 11D according to the third embodiment of the present invention. This valve-driving apparatus 11D also drives the intake valve 4 or the exhaust valve 5 utilizing a link. Here, the valve-driving apparatus 11D drives the intake valve 4, but the same structure can be employed for driving the exhaust valve 5. In FIGS. 20A, 20B and 20C, the same members as those of the valve-driving apparatus 11D shown in FIGS. 18A and 18B are designated with the same reference signs.

The valve-driving apparatus 11D shown in FIGS. 20A, 20B and 20C includes the electric motor 12 as a driving source, and a power transmission mechanism 110 which converts the rotation motion of the motor 12 into the opening and closing motion of the intake valve 4. The power transmission mechanism 110 includes the eccentric plate 101 which is rotated by the motor 12, a first link 111 rotatably connected, through a connection pin 102, to a connection position which is decentered from a rotation center of the eccentric plate 101, a second link 112 rotatably connected to upper ends of the first link 111 and the intake valve 4 through the connection pins 114 and 115, a third link 113 whose one end is rotatably connected to the second link 112 through a connection pin 116, and a control shaft 118 rotatably connected to the other end of the third link 113 through an eccentric pin 117. The eccentric plate 101 and the first link 111 function as a crank mechanism which converts the rotation motion of the motor 12 as reciprocating motion. The control shaft 118 is rotated by an actuator (not shown) and a position of the control shaft 118 can be adjusted by an appropriate resolution with respect to the circumferential direction.

In the valve-driving apparatus 11D having the above-described structure, in a state in which the control shaft 118 is held at a constant position with respect to the circumferential direction, the intake valve 4 can be reciprocatively rotated by continuously rotating the eccentric plate 101 in one direction by the motor 12. As apparent from the comparison between FIGS. 20B and 20C, by rotating the control shaft 118 and changing the position of the connection pin 116 through the third link 113 in a state in which the intake valve 4 is in intimate contact with the valve seat VS, a position of the connection pin 114 is changed and a correlation between the phase of the connection pin 102 and a distance between the connection pin 102 and the connection pin 115 is changed. With this, the lift amount of the intake valve 4 can be changed.

In the example shown in FIGS. 20A, 20B and 20C, the motor 12 is continuously rotated in one direction, and it is unnecessary to switch the rotation direction of the motor 12 and thus, there is a merit that the motor 12 can easily be controlled especially at the time of high speed rotation.

The above valve-driving apparatus 11D can also drive a plurality of intake valves 4 or exhaust valves 5 correspondingly provided on the same cylinder 2. Like the valve-driving apparatuses 11A and 11B in the first embodiment, a plurality of valve-driving apparatuses 11D are used for one internal combustion engine 1 for driving the intake valves 4 or the exhaust valves 5 of different cylinders 2.

Fourth Embodiment

Figure 21:
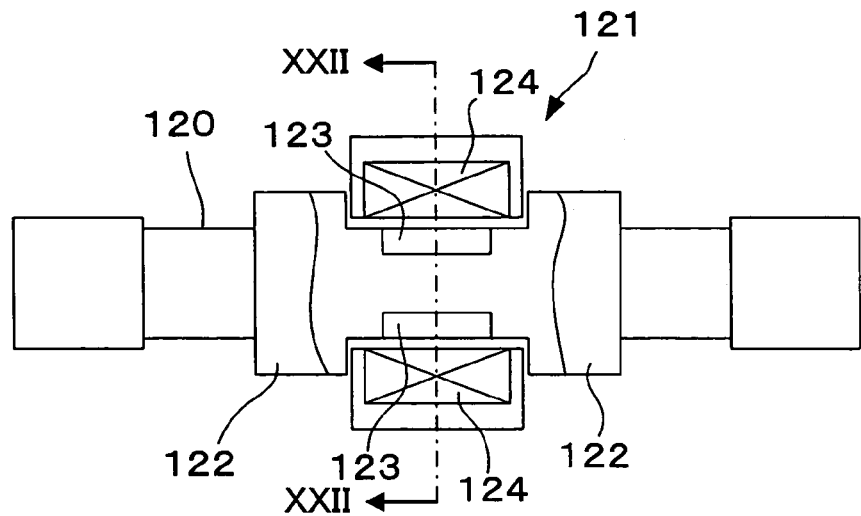
FIG. 21 shows a valve-driving apparatus which uses a cam shaft also as a rotation shaft of an electric motor.
Figure 22:
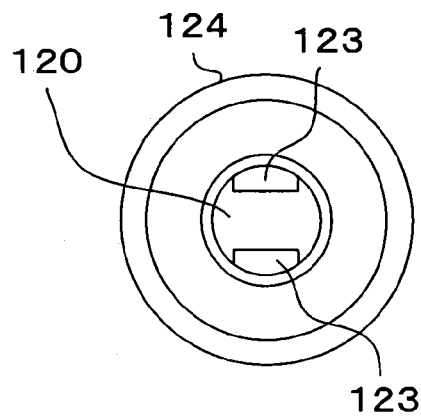
FIG. 22 is a sectional view taken along the line XXII-XXII in FIG. 21.

FIGS. 21 and 22 show a valve-driving apparatus 11E according to the fourth embodiment of the present invention. The valve-driving apparatus 11E drives the intake valve 4 or exhaust valve 5 utilizing the cam like the valve-driving apparatuses 11A and 11B, but is different from them in that a cam shaft 120 functions as a portion of an electric motor 121. That is, in the valve-driving apparatus 11E, a permanent magnet 123 is embedded between cams 122, 122 of the cam shaft 120, an electromagnetic coil 124 is disposed around the cam shaft 120, and an electric motor 121 utilizes the cam shaft 120 as a rotation shaft (output shaft). A structure from the cam 122 to the intake valve 4 or exhaust valve 5 is the same as that of a general cam type valve-driving apparatus.

Figure 23:
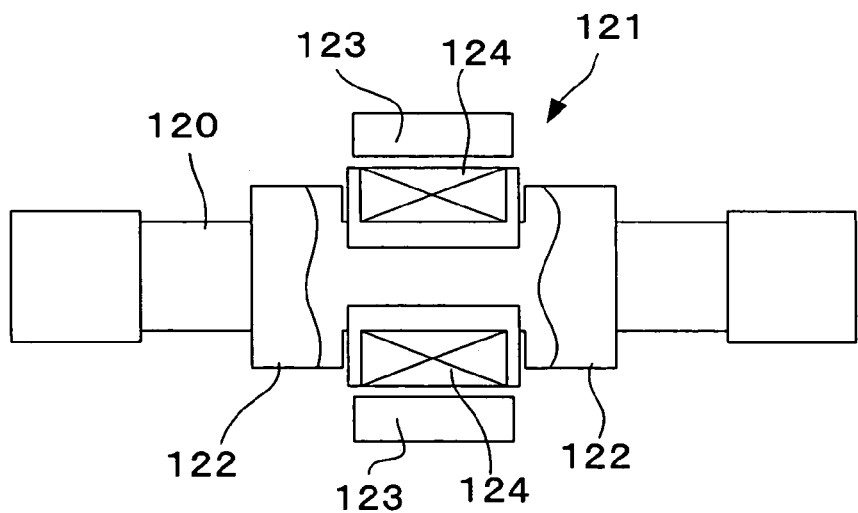
FIG. 23 shows an embodiment in which an electromagnetic coil and a permanent magnet shown in FIG. 21 are interchanged.

If the cam shaft itself is utilized as a rotation shaft of the electric motor, the gear train 15 shown in FIG. 2 can be omitted. With this, a space required above the intake valve 4 and the exhaust valve 5 can be reduced, and the entire height of the internal combustion engine including the valve-driving apparatus can be prevented from increasing. As shown in FIG. 23, the electromagnetic coil 124 may be embedded in the cam shaft 120, and the permanent magnet 123 may be disposed around the outer periphery of the electromagnetic coil 124 to form the electric motor 121.

The present invention is not limited to the embodiments, and may be carried out in various modes within its technical range. For example, various features concerning the mounting structures of the negative pressure generating apparatus and electric motor 12 explained in the first embodiment can also be applied to the second and third embodiments utilizing the link.

As explained above, according to the valve-driving system of the internal combustion engine of the present invention, the intake valves and exhaust valves of the plurality of cylinders can independently be opened and closed by the plurality of valve-driving apparatuses. Therefore, flexibility of the operation characteristics of the valves of each cylinder can be enhanced. Since the rotation motion of the motor is converted into the opening and closing motion of the intake valve or exhaust valve, it is possible to efficiently drive the intake valve or exhaust valve as compared with a case in which a screw mechanism is utilized.

What is claimed is:

1. A valve-driving system which is applied to an internal combustion engine having a plurality of cylinders for driving an intake or exhaust valve provided in each cylinder, comprising a plurality of valve-driving apparatuses, each of which is provided for at least each one of the intake valve and the exhaust valve, wherein each valve-driving apparatus comprises:

an electric motor as a driving source for generating rotation motion; and a power transmission mechanism for converting the rotation motion of the electric motor into an opening and closing motion of the valve to be driven and for transmitting the opening and closing motion to the valve through a cam, wherein the valve-driving apparatus further comprises a torque fluctuation suppressing mechanism which includes a rotation member that is provided in a motion transmitting path extending from the electric motor to the cam, and the torque fluctuation suppressing mechanism applies a reaction torque to the rotation member so that the reaction torque cancels the fluctuation of a torque which is applied to the cam.

2. The valve-driving system according to claim 1, wherein each cylinder is independently provided with the valve-driving apparatus.

3. The valve-driving system according to claim 1, wherein the intake valve and the exhaust valve of each cylinder are respectively provided with the valve-driving apparatuses independently.

4. The valve-driving system according to claim 1, wherein the valve-driving apparatus further comprises a valve-characteristics adjusting mechanism which changes a correlation between a phase of the cam and at least one of a lift amount and an operation angle of the valve.

5. The valve-driving system according to claim 1, wherein the torque fluctuation suppressing mechanism includes a cam surface provided on an outer periphery of the rotation member, a lifter opposed to the cam surface, and a spring device which biases the lifter against the cam surface, and wherein a contour of the cam surface of the rotation member is set such that a contact position between the lifter and the cam surface is most retracted toward a center of the rotation member in its radial direction at a position where a lift amount of the valve by the cam becomes maximum.

6. The valve-driving system according to claim 1, wherein a rotation shaft of the cam is provided with a shaft supporting section which rotatably fits to a cam supporting bearing, and wherein a factor which affects a friction resistance generated in a contact range between the shaft supporting section and the bearing is set unevenly with respect to a circumferential direction of the rotation shaft of the cam, so that the shaft supporting section and the bearing function as the torque fluctuation suppressing mechanism.

7. The valve-driving system according to claim 6, wherein as the factor, a width of the contact range with respect to an axial direction of the rotation shaft of the cam is set unevenly.

8. The valve-driving system according to claim 7, wherein a portion at which the friction resistance is increased is located on opposite side from a nose section of the cam with a rotation center of the rotation shaft of the cam interposed therebetween.

9. The valve-driving system according to claim 1, wherein the rotation shaft of the cam is provided with a balance adjusting device which cancels an unbalance of rotation mass concerning a rotation center of the rotation shaft provided by the cam.

10. The valve-driving system according to claim 9, wherein the rotation shaft of the cam is provided, as the balance adjusting device, with a deleting section which reduces the mass of the rotation shaft at a position closer to the nose section of the cam than the rotation center.

11. The valve-driving system according to claim 10, wherein a hole which is deviated closer to the nose section than the rotation center of the rotation shaft of the cam is formed as the deleting section, and the hole is utilized as an oil-supply hole to the cam.

12. The valve-driving system according to claim 1, wherein an entire periphery of a contour of the cam comprises a projecting curve surface.

13. The valve-driving system according to claim 1, wherein the rotation shaft of the cam is provided with one of a permanent magnet and an electromagnetic coil, the other one of the permanent magnet and the electromagnetic coil is provided around the rotation shaft, and the rotation shaft of the cam is utilized as a rotation shaft of the electric motor.

14. The valve-driving system according to claim 1, wherein the power transmission mechanism converts the rotation motion of the electric motor into the opening and closing motion utilizing the link.

15. The valve-driving system according to claim 14, wherein the power transmission mechanism includes a rotation member which is rotated by the electric motor, and a link section which is rotatably connected to the rotation member at a position deviated from the rotation center of the rotation member, and which is also turnably connected to the valve.

16. The valve-driving system according to claim 15, wherein the link section includes a first link which is rotatably connected to the rotation member, and a second link which is slidably connected to the first link within a predetermined limited range and which is also turnably connected to the valve.

17. The valve-driving system according to claim 14, wherein the power transmission mechanism includes a rotation member which is rotated by the electric motor, a first link which is rotatably connected to the rotation member at a position deviated from the rotation center of the rotation member, a second link which is rotatably connected to the first link and the valve, and a position adjusting device which changes a position of connection point between the first link and the second link.

18. The valve-driving system according to claim 1, wherein the electric motor of any one of the plurality of valve-driving apparatuses is utilized as a driving source of an air pressure adjusting pump.

19. The valve-driving system according to claim 18, wherein the electric motor which drives the valve of the cylinder which is disposed on the outermost side in the arrangement direction of the cylinders is utilized as the driving source of the air pressure adjusting pump.

20. The valve-driving system according to claim 18, wherein the pump is provided as a device which generates a negative pressure for a brake booster of a vehicle.

21. The valve-driving system according to claim 1, wherein at least a portion of the electric motor is exposed from an external upper surface of a head cover of the internal combustion engine.

22. The valve-driving system according to claim 21, wherein the electric motor is taken out from the head cover of the internal combustion engine and is disposed on an upper surface of the head cover.

23. The valve-driving system according to claim 21, wherein the internal combustion engine is mounted in the vehicle in a state that the arrangement direction of the plurality of cylinders coincides with the lateral direction of the vehicle, and that a cylinder head is located forward of a crank chamber.

24. The valve-driving system according to claim 21, wherein a connector of the electric motor is exposed from an upper portion of the head cover of the internal combustion engine, the valve-driving system further comprises a wiring member having a common substrate on which individual terminals, an aggregation terminal and an electric wiring are formed, in which each of the individual terminals is to be connected to the connector, the aggregation terminal is to be connected to a predetermined motor control circuit, and the electric wiring connects these terminals, and the wiring member is provided on the head cover such as to electrically connect each individual terminal and the connector.

25. The valve-driving system according to claim 1, further comprising a cooling device which cools the electric motor.

26. The valve-driving system according to claim 25, wherein a cooling water passage is provided around the electric motor, and the cooling water passage is included in a portion of a circulation path of cooling water in the internal combustion engine, thereby constituting the cooling device.

27. The valve-driving system according to claim 26, wherein the cooling water passage disposed around the electric motor is disposed between a cooling water outlet of a radiator for heat radiation and a cooling water inlet of the internal combustion engine.

28. The valve-driving system according to claim 25, further comprising a fan provided on the rotation shaft of the electric motor as the cooling device.

* * * * *